United States Patent
Kanno et al.

(10) Patent No.: US 11,061,175 B2
(45) Date of Patent: Jul. 13, 2021

(54) POLARIZING FILM, METHOD FOR PRODUCING SAME, OPTICAL FILM, IMAGE DISPLAY DEVICE, AND ADHESION IMPROVEMENT-TREATED POLARIZER

(71) Applicant: NITTO DENKO CORPORATION, Ibaraki (JP)

(72) Inventors: Ryo Kanno, Ibaraki (JP); Takeshi Saito, Ibaraki (JP); Tatsuya Yamasaki, Ibaraki (JP); Keisuke Kimura, Ibaraki (JP)

(73) Assignee: NITTO DENKO CORPORATION, Ibaraki (JP)

( * ) Notice: Subject to any disclaimer, the term of this patent is extended or adjusted under 35 U.S.C. 154(b) by 98 days.

(21) Appl. No.: 16/301,158

(22) PCT Filed: May 16, 2017

(86) PCT No.: PCT/JP2017/018419
§ 371 (c)(1),
(2) Date: Nov. 13, 2018

(87) PCT Pub. No.: WO2017/199978
PCT Pub. Date: Nov. 23, 2017

(65) Prior Publication Data
US 2019/0293851 A1 Sep. 26, 2019

(30) Foreign Application Priority Data

May 17, 2016 (JP) .............................. JP2016-099138
May 17, 2016 (JP) .............................. JP2016-099139

(51) Int. Cl.
| | | |
|---|---|---|
| *G02B 5/30* | (2006.01) | |
| *B32B 7/12* | (2006.01) | |
| *B32B 27/18* | (2006.01) | |
| *B32B 27/28* | (2006.01) | |
| *B32B 27/30* | (2006.01) | |
| *B32B 27/38* | (2006.01) | |
| *C08K 5/55* | (2006.01) | |
| *G02F 1/1335* | (2006.01) | |
| *C09J 201/02* | (2006.01) | |
| *C09D 185/00* | (2006.01) | |
| *C09D 183/00* | (2006.01) | |
| *G02B 1/14* | (2015.01) | |

(Continued)

(52) U.S. Cl.
CPC .............. *G02B 5/3025* (2013.01); *B32B 7/12* (2013.01); *B32B 27/18* (2013.01); *B32B 27/285* (2013.01); *B32B 27/30* (2013.01); *B32B 27/38* (2013.01); *C08K 5/55* (2013.01); *C09D 163/00* (2013.01); *C09D 183/00* (2013.01); *C09D 185/00* (2013.01); *C09J 7/30* (2018.01); *C09J 201/02* (2013.01); *G02B 1/14* (2015.01); *G02B 5/305* (2013.01); *G02B 5/3033* (2013.01); *G02F 1/1335* (2013.01); *G02F 1/133528* (2013.01); *B32B 2307/42* (2013.01); *G02F 2202/022* (2013.01); *G02F 2202/28* (2013.01)

(58) Field of Classification Search
CPC ......... G02B 1/14; G02B 5/3025; G02B 5/305
USPC ................................ 359/483.01, 487.02, 900
See application file for complete search history.

(56) References Cited

U.S. PATENT DOCUMENTS

| | | | |
|---|---|---|---|
| 7,326,374 B2 * | 2/2008 | Hatanaka | ............... C09J 175/04 264/1.34 |
| 7,906,216 B2 * | 3/2011 | Yaegashi | ............... G02B 1/105 428/448 |

(Continued)

FOREIGN PATENT DOCUMENTS

| | | |
|---|---|---|
| CN | 1381756 A | 11/2002 |
| CN | 1591056 A | 3/2005 |

(Continued)

OTHER PUBLICATIONS

International Search Report dated Aug. 8, 2017, issued in counterpart application No. PCT/JP2017/018419 (4 pages).

(Continued)

*Primary Examiner* — Ricky D Shafer
(74) *Attorney, Agent, or Firm* — Westerman, Hattori, Daniels & Adrian, LLP

(57) ABSTRACT

A polarizing film, comprising a polarizer, and a transparent protective film laminated on/over at least one surface of the polarizer to interpose an adhesive layer between the surface and the transparent protective film, and the polarizing film comprising, on/over the adhesion surface of the polarizer, an adhesion-improving layer interposed between the polarizer and the adhesive layer. The adhesion-improving layer preferably comprises a compound represented by the following general formula (1):

[Formula 1]

$$X-B\begin{matrix}OR^1\\OR^2\end{matrix} \quad (1)$$

wherein X is a functional group containing a reactive group, and $R^1$ and $R^2$ each independently represent a hydrogen atom, or an aliphatic hydrocarbon group, aryl group or heterocyclic group that may have a substituent, and the compound represented by the general formula (1) is interposed between the polarizer and the adhesive layer.

12 Claims, No Drawings

(51) Int. Cl.
    *C09J 7/30*     (2018.01)
    *C09D 163/00*     (2006.01)

(56) References Cited

U.S. PATENT DOCUMENTS

| | | | |
|---|---|---|---|
| 10,696,877 B2* | 6/2020 | Shimokawa | B32B 27/306 |
| 10,899,946 B2* | 1/2021 | Saito | C09J 4/00 |
| 2002/0176038 A1 | 11/2002 | Watanabe et al. | |
| 2005/0084670 A1 | 4/2005 | Satake et al. | |
| 2008/0113119 A1* | 5/2008 | Tsujiuchi | G02B 1/105 |
| | | | 428/1.31 |
| 2008/0213585 A1 | 9/2008 | Moroishi et al. | |
| 2009/0017298 A1 | 1/2009 | Okada et al. | |
| 2009/0202822 A1* | 8/2009 | Hasegawa | G02B 1/14 |
| | | | 428/339 |
| 2013/0070186 A1* | 3/2013 | Kunai | B32B 27/306 |
| | | | 349/96 |
| 2016/0223719 A1* | 8/2016 | Ishiguro | G02B 5/3025 |
| 2016/0320538 A1 | 11/2016 | Kunai | |
| 2016/0327711 A1 | 11/2016 | Ishiguro et al. | |
| 2017/0107369 A1* | 4/2017 | Kitayama | G02B 5/30 |
| 2017/0299920 A1* | 10/2017 | Mita | C09J 129/04 |
| 2018/0052269 A1* | 2/2018 | Saito | C09J 7/30 |
| 2019/0031794 A1* | 1/2019 | Yamasaki | C08F 2/48 |
| 2019/0031920 A1* | 1/2019 | Saito | C08F 2/50 |

FOREIGN PATENT DOCUMENTS

| | | |
|---|---|---|
| CN | 1625702 A | 6/2005 |
| CN | 101343518 A | 1/2009 |
| CN | 101679819 A | 3/2010 |
| CN | 105229099 A | 1/2016 |
| JP | 2001-296427 A | 10/2001 |
| JP | 2012-52000 A | 3/2012 |
| JP | 2015-108099 A | 6/2015 |
| JP | 2015-143848 A | 8/2015 |
| KR | 10-2016-54229 A | 5/2016 |
| WO | 2015/022825 A1 | 2/2015 |
| WO | 2015/053359 A1 | 4/2015 |
| WO | 2015/098734 A1 | 7/2015 |
| WO | 2015/111547 A1 | 7/2015 |
| WO | 2016/010031 A1 | 1/2016 |
| WO | 2016/143885 A1 | 9/2016 |

OTHER PUBLICATIONS

Notification of Transmittal of Translation of the International Preliminary Report on Patentability (Form PCT/IB/338) issued in counterpart International Application No. PCT/JP2017/018419 dated Nov. 29, 2018, with Forms PCT/IB/373 and PCT/ISA/237. (10 pages).
Office Action dated Sep. 28, 2020, issued in counterpart Taiwanese Application No. 106116283, with English translation (10 pages).
Office Action dated Sep. 2, 2020, issued in counterpart Chinese Application No. 201780027168.3, with English translation (29 pages).
Office Action dated Aug. 18, 2020, issued in counterpart TW application No. 106116284, with English translation. (11 pages).
Office Action dated Aug. 4, 2020, issued in counterpart CN application No. 201780023947.6, with English translation. (22 pages).
Office Action dated Feb. 19, 2021, issued in counterpart KR Application No. 10-2018-7025863, with English Translation. (10 pages).
Office Action dated Feb. 25, 2021, issued in counterpart TW Application No. 106116283, with English Translation. (6 pages).
Office Action dated, dated Mar. 24, 2021 counterpart KR Application No. 10-2018-7025848, with English translation. (10 pages).
Office Action dated Apr. 16, 2021, issued in counterpart CN Application No. 201780027168.3, with English Translation. (20 pages).
Office Action dated Apr. 2, 2021, issued in counterpart CN Application No. 201780023947.6, with English Translation. (18 pages).
Office Action dated May 6, 2021, issued in counterpart JP Application No. 2018-518319, with English Translation. (8 pages).
Office Action dated May 6, 2021, issued in JP Application No. 2018-518320, with English Translation. (7 pages) counterpart to U.S. Appl. No. 16/301,207.

* cited by examiner

POLARIZING FILM, METHOD FOR PRODUCING SAME, OPTICAL FILM, IMAGE DISPLAY DEVICE, AND ADHESION IMPROVEMENT-TREATED POLARIZER

TECHNICAL FIELD

The present invention relates to a polarizing film in which a transparent protective film is laminated on/over at least one surface of a polarizer to interpose an adhesive layer between the surface and the transparent protective film. This polarizing film is usable singly or in the form of an optical film in which this polarizing film is laminated, so as to form an image display device such as a liquid crystal display device (LCD), an organic EL display device, a CRT or a PDP.

BACKGROUND ART

In watches, portable telephones, PDAs, notebook PCs, monitors for personal computers, DVD players, TVs and others, liquid crystal display devices have been rapidly developing in the market. A liquid crystal display device is a device making the state of polarized light visible by switching of a liquid crystal. In light of the display principle thereof, a polarizer is used. In particular, TVs and other articles have been increasingly required to be higher in brightness and contrast, and wider in viewing angle. Their polarizing film has also been increasingly required to be higher in transmittance, polarization degree, color reproducibility, and others.

As a polarizer, an iodine-based polarizer has been most popularly and widely used, which has a structure obtained by adsorbing iodine onto, for example, a polyvinyl alcohol (hereinafter also referred to merely as a "PVA"), and then stretching the resultant. A generally used polarizing film is a polarizing film in which transparent protective films are bonded, respectively, onto both surfaces of a polarizer through the so-called water-based adhesive, in which a polyvinyl alcohol-based material is dissolved in water (Patent Document 1 listed below). For the transparent protective films, for example, triacetylcellulose is used, which has a high moisture permeability. In the case of the use of the water-based adhesive (the so-called wet lamination), a drying step is required after the transparent protective films are bonded to the polarizer.

Instead of the water-based adhesive, an active-energy-ray-curable adhesive is suggested. When the active-energy-ray-curable adhesive is used to produce polarizing films, no drying step is required. Thus, the polarizing films can be improved in producibility. For example, the inventors have suggested a radical-polymerizing type active-energy-ray-curable adhesive, using an N-substituted amide-based monomer as a curable component (Patent Document 2 listed below).

PRIOR ART DOCUMENTS

Patent Documents

Patent Document 1: JP-A-2001-296427
Patent Document 2: JP-A-2012-052000

SUMMARY OF THE INVENTION

Problems to be Solved by the Invention

An adhesive layer formed by using the active-energy-ray-curable adhesive described in Patent Document 2 can sufficiently pass a water resistance test of immersing the adhesive layer into, for example, hot water of 60° C. temperature for 6 hours, and subsequently evaluating whether or not the layer undergoes discoloration or exfoliation. However, in recent years, an adhesive for polarizing films has been required to be further improved in water resistance to such a degree that the resultant adhesive layer can pass a severer water resistance test, for example, in which at the time of immersing this layer in water (or saturating the layer with water) and then peeling off ends of the layer with nails, whether or not the layer undergoes exfoliation is evaluated. In the actual circumstances, therefore, about the active-energy-ray-curable adhesive described in Patent Document 2 and other adhesives for polarizing films that have been reported up to the present time, there remains a room for a further improvement in water resistance.

In light of the above-mentioned actual situation, the present invention has been developed. An object thereof is to provide a polarizing film that is a film in which a polarizer and a transparent protective film are good in adhesion to an adhesive layer, and that can persist adhering strength even in a dew condensation environment, or under a condition that the polarizing film is immersed in water or any other severe condition.

Another object of the present invention is to provide an optical film using the polarizing film, or an image display device using the polarizing film or the optical film.

Means for Solving the Problems

In order to solve the above-mentioned problems, the inventors have repeatedly made eager investigations to find out that the objects can be attained by adopting a structure yielded by forming an adhesion-improving layer on/over an adhesion surface of a polarizer, and laminating this polarizer and a transparent protective film to each other through an adhesive layer. Thus, the present invention has been solved.

Thus, the present invention relates to a polarizing film including a polarizer, and a transparent protective film laminated on/over at least one surface of the polarizer to interpose an adhesive layer between the surface and the transparent protective film, and the polarizing film including, on/over the adhesion surface of the polarizer, an adhesion-improving layer interposed between the polarizer and the adhesive layer.

It is preferred in the polarizing film that the adhesion-improving layer includes a compound represented by the following general formula (1):

[Formula 1]

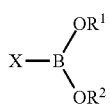

(1)

wherein X is a functional group containing a reactive group, and $R^1$ and $R^2$ each independently represent a hydrogen atom, or an aliphatic hydrocarbon group, aryl group or heterocyclic group that may have a substituent; and the compound represented by the general formula (1) is interposed between the polarizer and the adhesive layer.

It is preferred in the polarizing film that the compound represented by the general formula (1) is a compound represented by the following general formula (1'):

[Formula 2]

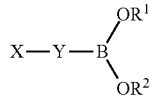
(1')

wherein Y is an organic group, and X, $R^1$ and $R^2$ are the same as described above.

It is preferred in the polarizing film that the reactive group that the compound represented by the general formula (1) has is at least one reactive group selected from the group consisting of α,β-unsaturated carbonyl, vinyl, vinyl ether, epoxy, oxetane, amino, aldehyde, mercapto, and halogen groups.

It is preferred in the polarizing film that the adhesion-improving layer includes an organometallic compound having a structural formula having an M-O bond wherein M is silicon, titanium, aluminum or zirconium, and O represents an oxygen atom, and the organometallic compound is interposed between the polarizer and the adhesive layer.

It is preferred in the polarizing film that the organometallic compound is at least one compound selected from the group consisting of metal alkoxides and metal chelates.

It is preferred in the polarizing film that the organometallic compound is an organic silicon compound.

It is preferred in the polarizing film that the metal of the metal alkoxides and the metal chelates is titanium.

It is preferred in the polarizing film that the organometallic compound is at least one selected from the group consisting of titanium acylates, titanium alkoxides, and titanium chelates.

The present invention also relates to a method for producing a polarizing film including a polarizer, and a transparent protective film laminated on/over at least one surface of the polarizer to interpose an adhesive layer between the surface and the transparent protective film; the method including: an adhesion improvement-treating step of causing a compound represented by the following general formula (1):

[formula 3]

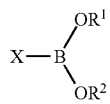
(1)

wherein X is a functional group containing a reactive group, and $R^1$ and $R^2$ each independently represent a hydrogen atom, or an aliphatic hydrocarbon group, aryl group or heterocyclic group that may have a substituent, or an organometallic compound having a structural formula having an M-O bond wherein M is silicon, titanium, aluminum or zirconium, and O represents an oxygen atom to adhere to the adhesion surface of the polarizer; an applying step of applying a curable resin composition to the adhesion surface of at least one of the polarizer and the transparent protective film; a bonding step of bonding the polarizer and the transparent protective film to each other; and an adhering step of radiating an active energy ray to the resultant workpiece from a polarizer surface side or a transparent protective film surface side of the workpiece to yield an adhesive layer, and causing the polarizer and the transparent protective film to adhere to each other through the yielded adhesive layer.

It is preferred in the method for producing a polarizing film that the compound represented by the general formula (1) is a compound represented by the following general formula (1'):

[Formula 4]

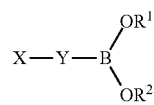
(1')

wherein Y is an organic group, and X, $R^1$ and $R^2$ are the same as described above.

Furthermore, the present invention relates to an optical film, in which at least one polarizing film as defined above is laminated; or an image display device, using the polarizing film as defined above or the optical film as defined above.

Effect of the Invention

When a polarizing film in which a transparent protective film is laminated on a polarizer to interpose an adhesive layer therebetween is exposed to a dew condensation environment, a mechanism that adhesion peeling is generated between the adhesive layer and the polarizer can be presumed as follows: Water that has permeated the protective film diffuses initially into the adhesive layer, and then the water diffuses to the polarizer interfacial side of this layer. In any conventional polarizing film, hydrogen bonding and/or ion bonding contribute (s) largely to adhering strength between its adhesive layer and its polarizer; however, the water that has diffused to the polarizer interfacial side causes dissociation of the hydrogen bonding and the ion bonding in the interface. As a result, the adhering strength between the adhesive layer and the polarizer is lowered. This lowering may cause adhesion peeling between the adhesive layer and the polarizer in a dew condensation environment.

In the meantime, the polarizing film according to the present invention has, on/over the adhesion surface of the polarizer, an adhesion-improving layer interposed between the polarizer and the adhesive layer. For this reason, even in a dew condensation environment, the adhesive layer and the polarizer can be restrained from undergoing adhesion peeling therebetween to improve the polarizing film in adhesion therein. When the adhesion-improving layer is formed on/over the adhesion surface of the polarizer, the adhesion in the polarizing film is remarkably improved by the matter that the adhesion surface of the polarizer includes a compound having a boric acid group and/or a borate group (compound represented by the above-mentioned general formula (1)). Reasons therefor would be as follows:

The boric acid group and/or the borate group is/are easily combined with hydroxyl groups and others which the polarizer that is particularly of a polyvinyl alcohol type and the transparent protective film have, so as to form covalent bonds. Moreover, the compound represented by the general formula (1) further has X including a reactive group, and reacts through the reactive group, which X includes, with a curable component included in the adhesive layer. In other words, the boric acid group and/or the borate group, which the compound represented by the general formula (1) has, is/are strongly bonded to the hydroxyl groups and the others, which the polarizer has, through covalent bonding. Additionally, the reactive group which the compound represented by the general formula (1) has is strongly bonded through a covalent bond to the reactive group made naked to the surface of the adhesion surface of the adhesive layer. In this way, even when water is present in the interface between the polarizer and the adhesive layer, these interact strongly with each other not only through the hydrogen bonding and/or ion bonding but also through the covalent bonding, so that the polarizer and the adhesive layer are dramatically improved in adhesion water-resistance therebetween.

When the compound represented by the general formula (1) includes a reactive group through its phenylene or alkylene group bonded to its boric acid atom, adhesion water-resistance is dramatically improved between the polarizer having, on the surface thereof, this reactive group, and the adhesive layer. A reason therefor can be presumed as follows: As described above, in the compound represented by the general formula (1), its boric acid group and/or borate group react(s) with hydroxyl groups and others which the polyvinyl alcohol type polarizer has, so that these groups are strongly bonded to each other. However, unless the reactive group which the compound represented by the general formula (1) has reacts with any curable component included in the adhesive layer, in the end a sufficient improvement is not made in adhesion water-resistance between the polarizer and the adhesive layer. In this case, the boric acid group and/or borate group, which the compound represented by the general formula (1) has, and further the polarizer and others show hydrophilicity; thus, affinity is not very high between the compound represented by the general formula (1) and the curable component included in the adhesive composition. However, when the compound represented by the general formula (1) contains a reactive group to interpose, therebetween, its phenylene or alkylene group bonded to its boron atom (the case of the general formula (1')), the phenylene or alkylene group shows affinity with the curable component, so that the reactive group which the compound represented by the general formula (1) has, this reactive group having reacted with the polarizer and others, reacts very effectively with the curable component included in the adhesive layer. Consequently, adhesion water-resistance is in particular dramatically improved between the polarizer and the adhesive layer.

As the compound having a boric acid group and/or a borate group and having a reactive group, there is a compound containing a reactive group to interpose, therebetween, an oxygen atom bonded to a boron atom (hereinafter referred to also as a "B—O bond containing compound"). However, this compound is largely different, in adhesion water-resistance improvement-degree of the polarizer, from the compound containing a reactive group to interpose, therebetween, a phenylene or alkylene group bonded to a boron atom (hereinafter referred to also as a "B—C bond containing compound") when the surface of the polarizer has each of these compounds. Reasons therefor would the following (i) and (ii): (i) for example, in a dew condensation environment, the boron-oxygen bond in the B—O bond containing compound is easily hydrolyzed so that adhesion water-resistance is deteriorated between the polarizer and transparent protective film, and the adhesive layer. In the meantime, (ii) the boron-carbon bond in the B—C bond containing compound is excellent in hydrolysis resistance even in a dew condensation environment. As a result, the polarizer and the transparent protective film are very dramatically improved in adhesion water-resistance to the adhesive layer.

Furthermore, in the present invention, the adhesion surface of the polarizer includes the organometallic compound, which has a structural formula having an M-O bond. This matter improves the polarizing film in adhesion therein even when the adhesion-improving layer is formed. A reason therefor would be as follows:

In the case of using a polarizer including the organometallic compound, which has a structural formula having an M-O bond, in the adhesion surface of the transparent protective film, this organometallic compound is turned to an active metal species by aid of water, so that the organometallic compound can form a strong bond to the polarizer. However, the organometallic compound has plural reactive points. Thus, the organometallic compound that has reacted with the polarizer still has unreacted ones of the reactive points. At a stage of laminating the adhesive layer onto the polarizer in order to laminate the transparent protective film to the polarizer, the organometallic compound can form strong bonds to a curable component included in the adhesive layer. As described above, the organometallic compound, which has a structural formula having an M-O bond, can form strong bonds to both of the polarizer and the adhesive layer; accordingly, the adhesion water-resistance is dramatically improved between the polarizer and the adhesive layer.

MODE FOR CARRYING OUT THE INVENTION

The polarizing film according to the present invention has an adhesion-improving layer interposed between a polarizer and an adhesive layer, and on an adhesion surface of the polarizer. It is particularly preferred from the viewpoint of an improvement of the polarizing film in adhesion therein that the polarizing film includes a compound represented by a general formula (1), which will be detailed later, or an organometallic compound, and the compound is interposed between the polarizer and the adhesive layer to form the adhesion-improving layer. Hereinafter, a description will be made about the case of using the compound represented by the general formula (1) to form the adhesion-improving layer. Next, a description will be made about the case of using the organometallic compound.

<Compound Represented by General Formula (1)>

It is preferred that the present invention includes a compound represented by the following general formula (1), and the compound represented by the formula (1) is interposed between a polarizer and an adhesive layer to form an adhesion-improving layer:

[Formula 5]

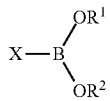

(1)

wherein X is a functional group containing a reactive group, and $R^1$ and $R^2$ each independently represent a hydrogen atom, or an aliphatic hydrocarbon group, aryl group or heterocyclic group that may have a substituent.

In the polarizing film, the compound represented by the general formula (1) may be interposed in an unreacted state between the polarizer and the adhesive layer, or may be interposed therebetween in a state that its individual functional groups have reacted. The wording "including, on/over the adhesion surface of the polarizer, the compound represented by the general formula (1)" means that, for example, at least one molecule of the compound represented by the general formula (1) is present on/over the adhesion surface. However, in order to improve adhesion water-resistance sufficiently between the polarizer and the adhesive layer, an adhesion-improving composition including the compound represented by the general formula (1) is used to form an adhesion-improving layer preferably on/over at least one portion of the adhesion surface, more preferably on/over the whole of the adhesion surface.

The above-mentioned aliphatic hydrocarbon group is, for example, a linear or branched alkyl group which has 1 to 20 carbon atoms and may have a substituent, a cyclic alkyl group which has 3 to 20 carbon atoms and may have a substituent, or an alkenyl group which has 2 to 20 carbon atoms. The aryl group is, for example, a phenyl group which has 6 to 20 carbon atoms and may have a substituent, or a naphthyl group which has 10 to 20 carbon atoms and may have a substituent. The heterocyclic group is, for example, a 5-membered or 6-membered group which contains at least one heteroatom, and may have a substituent. These may be linked to each other to form a ring. In the general formula (1), $R^1$ and $R^2$ are each preferably a hydrogen atom, or a linear or branched alkyl group having 1 to 3 carbon atoms, most preferably a hydrogen atom.

The group X, which the compound represented by the general formula (1) has, is a functional group including a reactive group, and is a functional group that can react with a curable component contained in the adhesive layer. Examples of the reactive group, which X includes, include hydroxyl, amino, aldehyde, carboxyl, vinyl, (meth)acryl, styryl, (meth)acrylamide, vinyl ether, epoxy, oxetane, α,β-unsaturated carbonyl, mercapto, and halogen groups. When the curable resin composition from which the adhesive layer is made is active-energy-ray curable, the reactive group, which X includes, is preferably at least one reactive group selected from the group consisting of vinyl, (meth)acryl, styryl, (meth)acrylamide, vinyl ether, epoxy, oxetane, and mercapto groups. When the curable resin composition, from which the adhesive layer is made, is in particular radical polymerizable, the reactive group, which X includes, is preferably at least one reactive group selected from the group consisting of (meth)acryl, styryl, and (meth)acrylamide groups. It is more preferred that the compound represented by the general formula (1) has a (meth)acrylamide group since the compound is high in reactivity to be increased in copolymerization rate in the active-energy-ray-curable adhesive composition. This case is preferred also since the (meth) acrylamide group is high in polarity so that the resultant adhesive is excellent in adhesion to produce the advantageous effects of the present invention effectively. When the curable resin composition, from which the adhesive layer is made, is cationic polymerizable, the reactive group, which X includes, has preferably at least one functional group selected from the group consisting of hydroxyl, amino, aldehyde, carboxyl, vinyl ether, epoxy, oxetane, and mercapto groups. When the reactive group has, in particular, an epoxy group, close adhesion between the resultant adhesive layer and an adherend is favorably excellent. When the reactive group has a vinyl ether group, the curable resin composition is favorably excellent in curability.

A preferred and specific example of the compound represented by the general formula (1) is a compound represented by the following general formula (1'):

[Formula 6]

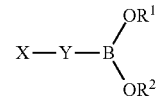

(1')

wherein Y is an organic group, and X, $R^1$ and $R^2$ are the same as described above. More preferred examples thereof include the following compounds (1a) to (1d):

[Formula 7]

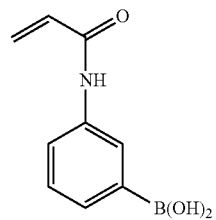

(1a)

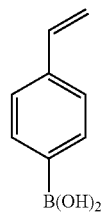

(1b)

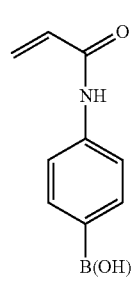

(1c)

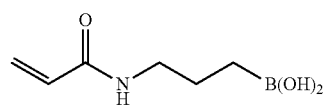

(1d)

In the present invention, the compound represented by the general formula (1) may be a compound in which a reactive group is bonded directly to a boron atom. However, as illustrated as the above-mentioned specific examples, it is preferred that the compound represented by the general formula (1) is a compound in which a reactive group and a boron atom are bonded to each other to interpose, therebetween, an organic group, that is, a compound represented by the general formula (1'). When the compound represented by the general formula (1) is, for example, a compound in which an organic group is bonded to a reactive group to interpose, therebetween, an oxygen atom bonded to a boron atom, the polarizing film tends to be deteriorated in adhesion water-resistance. In the meantime, in a case where the compound represented by the general formula (1) is not a compound having a boron-oxygen bond, but a compound in which a boron atom is bonded to an organic group so that while this compound has a boron-carbon bond, the compound contains a reactive group (in the case of the general formula (1')), the polarizing film is favorably improved in adhesion water-resistance. The organic group specifically denotes an organic group that has 1 to 20 carbon atoms and may have a substituent. More specific examples thereof include any linear or branched alkylene group that has 1 to 20 carbon atoms and may have a substituent, any cyclic alkylene group that has 3 to 20 carbon atoms and may have a substituent, any phenylene group that has 6 to 20 carbon atoms and may have a substituent, and any naphthylene group that has 10 to 20 carbon atoms and may have a substituent.

Examples of the compound represented by the general formula (1) include, besides the compounds given above as the examples thereof, an ester made from hydroxyethylacrylamide and boric acid, an ester made from methylolacrylamide and boric acid, an ester made from hydroxyethyl acrylate and boric acid, an ester made from hydroxybutyl acrylate and boric acid, and any other ester made from a (meth)acrylate and boric acid.

The method for using an adhesion-improving composition including a compound represented by the general formula (1) to form an adhesion-improving layer on an adhesion surface of a polarizer is, for example, a method of producing an adhesion-improving composition (A) including a compound represented by the general formula (1) and then forming this composition into an adhesion-improving layer on an adhesion surface of a polarizer by, for example, applying. Substances that are other than any compound represented by the general formula (1) and may be included in the adhesion-improving composition (A) are, for example, a solvent and an additive.

When the adhesion-improving composition (A) includes a solvent, it is allowable to apply the composition (A) onto an adhesion surface of a polarizer, and optionally subject the resultant to a drying step or a curing treatment (for example, thermal treatment).

The solvent, which may be included in the adhesion-improving composition (A), is preferably a solvent capable of stabilizing a compound represented by the general formula (1) to dissolve or disperse the compound. The solvent may be an organic solvent, water, or a mixed solvent of these solvents. The solvent is selected from, for example, the following: ethyl acetate, butyl acetate, 2-hydroxyethyl acetate, and other esters; methyl ethyl ketone, acetone, cyclohexanone, methyl isobutyl ketone, diethyl ketone, methyl-n-propyl ketone, acetylacetone, and other ketones; tetrahydrofuran (THF), dioxane, and other cyclic ethers; n-hexane, cyclohexane, and other aliphatic or alicyclic hydrocarbons; toluene, xylene, and other aromatic hydrocarbons; methanol, ethanol, n-propanol, isopropanol, cyclohexanol, and other aliphatic or alicyclic alcohols; ethylene glycol monomethyl ether, ethylene glycol monoethyl ether, diethylene glycol monoethyl ether, and other glycol ethers; and diethylene glycol monomethyl ether acetate, diethylene glycol monoethyl ether acetate, and other glycol ether acetates.

Examples of the additive, which may be included in the adhesion-improving composition (A), include a binder resin, a surfactant, a plasticizer, a tackifier, a low molecular weight polymer, a polymerizable monomer, a surface lubricant, a leveling agent, an antioxidant, a corrosion inhibitor, a light stabilizer, an ultraviolet absorber, a polymerization inhibitor, a silane coupling agent, a titanium coupling agent, an inorganic or organic filler, a metal powder, and a particulate or foil material. The binder resin is sufficient to be transparent, and examples thereof include acrylic resins, styrene-based resins, polyvinyl alcohol-based resins, urethane resins, polyester resins, polypropylene resins, polyethylene resins, epoxy resins, polycarbonate resins, and other polymers. When the adhesion-improving composition (A) includes a binder resin, the content thereof is preferably 1 part or more, preferably 5 parts or more by weight for 100 parts by weight of the compound represented by the general formula (1). In the meantime, the content is preferably 300 parts or less, more preferably 200 parts or less, even more preferably 150 parts or less, in particular preferably 100 parts or less by weight therefor. When the adhesion-improving composition (A) includes a leveling agent, the content thereof is 1 part or more, preferably 5 parts by weight or more for 100 parts by weight of the compound represented by the general formula (1). In the meantime, the content is preferably 35 parts or less, more preferably 20 parts or less, even more preferably 10 parts or less by weight therefor. When adhesion-improving composition (A) includes any other additive, the content thereof is preferably 1 part or more for 100 parts by weight of the compound represented by the general formula (1). In the meantime, the content is preferably 30 parts or less therefor.

When the adhesion-improving composition (A) includes a polymerization initiator, the compound represented by the general formula (1) may react in the adhesion-improving layer before the adhesive layer is laminated thereonto. Thus, the polarizing film may not sufficiently gain an adhesion water-resistance improving effect, which is a primary purpose. Accordingly, the content of the polymerization initiator in the adhesion-improving layer is preferably less than 2%, preferably less than 0.5% by weight. The composition in particular preferably contains no polymerization initiator.

If the content of the compound represented by the general formula (1) in the adhesion-improving layer is too small, the proportion of the compound represented by the general formula (1) that is present in the adhesion-improving layer surface is lowered so that the adhesion-improving effect may fall. Thus, the content of the compound represented by the general formula (1) in the adhesion-improving layer is preferably 1% or more, more preferably 20% or more, even more preferably 40% or more by weight.

It is allowable that the present invention includes an organometallic compound having a structural formula having an M-O bond wherein M is silicon, titanium, aluminum or zirconium, and O represents an oxygen atom, and the organometallic compound is interposed between the polarizer and the adhesive layer to form an adhesion-improving layer. In the polarizing film, the organometallic compound may be interposed in an unreacted state between the polarizer and the adhesive layer, or may be interposed therebetween in the state that its individual functional groups have reacted. The wording "including, on/over the adhesion surface of the polarizer, the organometallic compound" means that, for example, at least one molecule of the organometallic compound is present on/over the adhesion surface. However, in order to improve adhesion water-resistance sufficiently between the polarizer and the adhesive layer, an adhesion-improving composition including the organometallic compound is used to form an adhesion-improving layer preferably on/over at least one portion of the adhesion surface, more preferably on/over the whole of the adhesion surface.

In embodiments that will be given below, a description will be made about an example in which an adhesion-improving layer is formed on at least one portion of the adhesion surface described just above, that is, about the following:

a polarizing film in which a transparent protective film is laminated on at least one surface of a polarizer to interpose an adhesive layer between the surface and the transparent protective film; and the adhesion surface of the polarizer before the laminating has an adhesion-improving layer formed using an organometallic compound having a structural formula having an M-O bond wherein M is silicon, titanium, aluminum or zirconium, and O represents an oxygen atom.

<Organometallic Compound>

The organometallic compound used in the present invention has a structural formula having an M-O bond wherein M is silicon, titanium, aluminum or zirconium, and O represents an oxygen atom. It is particularly preferred in the invention that the organometallic compound is preferably at least one selected from the group consisting of organic silicon compounds, metal alkoxides, and metal chelates.

<Organic Silicon Compounds>

As any one of the organic silicon compounds, a compound having a Si—O bond is usable without any especial limitation. A specific example thereof is an active-energy-ray-curable organic silicon compound or an organic silicon compound having no active-energy-ray curability. The organic group which the organic silicon compound has in particular preferably has 3 or more carbon atoms. Examples of the active-energy-ray-curable compound include vinyltrichlorosilane, vinyltrimethoxysilane, vinyltriethoxysilane, 2-(3,4 epoxycyclohexyl) ethyltrimethoxysilane, 3-glycidoxypropyltrimethoxysilane, 3-glycidoxypropylmethyldiethoxysilane, 3-glycidoxypropyltriethoxysilane, p-styryltrimethoxysilane, 3-methacryloxypropylmethyldimethoxysilane, 3-methacryloxypropyltrimethoxysilane, 3-methacryloxypropylmethyldiethoxysilane, 3-methacryloxypropyltriethoxysilane, and 3-acryloxypropyltrimethoxysilane.

Preferred are 3-methacryloxypropyltrimethoxysilane, and 3-acryloxypropyltrimethoxysilane.

A specific example of the compound having no active-energy-ray curability is preferably a compound having an amino group. Specific examples of the compound having an amino group include γ-aminopropyltrimethoxysilane, γ-aminopropyltriethoxysilane, γ-aminopropyltriisopropoxysilane, γ-aminopropylmethyldimethoxysilane, γ-aminopropylmethyldiethoxysilane, γ-(2-aminoethyl)aminopropyltrimethoxysilane, γ-(2-aminoethyl)aminopropylmethyldimethoxysilane, γ-2-aminoethyl) aminopropyltriethoxysilane, γ-(2-aminoethyl)aminopropylmethyldiethoxysilane, γ-(2-aminoethyl)aminopropyltriisopropoxysilane, γ-(2-(2-aminoethyl)aminoethyl)aminopropyltrimethoxysilane, γ-(6-aminohexyl)aminopropyltrimethoxysilane, 3-(N-ethylamino)-2-methylpropyltrimethoxysilane, γ-ureidopropyltrimethoxysilane, γ-ureidopropyltriethoxysilane, N-phenyl-γ-aminopropyltrimethoxysilane, N-benzyl-γ-aminopropyltrimethoxysilane, N-vinylbenzyl-γ-aminopropyltriethoxysilane, N-cyclohexylaminomethyltriethoxysilane, N-cyclohexylaminomethyldiethoxymethylsilane, N-phenylaminomethyltrimethoxysilane, (2-aminoethyl) aminomethyltrimethoxysilane, N,N'-bis[3-(trimethoxysilyl)propyl] ethylenediamine, and other amino-group-containing silanes; and N-(1,3-dimethylbutylidene)-3-(triethoxysilyl)-1-propaneamine, and other ketimines type silanes.

Such compounds each having an amino group may be used singly or in any combination of two or more thereof. Out of the compounds, the following are preferred in order that the adhesive layer can ensure a good adhesion: γ-aminopropyltrimethoxysilane, γ-(2-aminoethyl)aminopropyltrimethoxysilane, γ-(2-aminoethyl)aminopropylmethyldimethoxysilane, γ-(2-aminoethyl)aminopropyltriethoxysilane, γ-(2-aminoethyl)aminopropylmethyldiethoxysilane, and N-(1,3-dimethylbutylidene)-3-(triethoxysilyl)-1-propanamine Specific examples of the compound having no active-energy-ray curability include, besides the above-mentioned examples, 3-ureidopropyltriethoxysilane, 3-chloropropyltrimethoxysilane, 3-mercaptopropylmethyldimethoxysilane, 3-mercaptopropyltrimethoxysilane, bis (triethoxysilylpropyl) tetrasulfide, 3-isocyanatopropyltriethoxysilane, and imidazole silane.

<At Least One Compound Selected from Group Consisting of Metal Alkoxides and Metal Chelates>

The metal alkoxides are each a compound in which at least one alkoxy group, which is an organic group, is bonded to a metal The metal chelates are each a compound in which an organic group is bonded or coordinated through an oxygen atom to a metal. The metals are each preferably titanium, aluminum or zirconium. Out of these metals, aluminum and zirconium are speedier in reactivity than titanium, and may make the pot life of the adhesive composition shorter and make the adhesion water-resistance improving effect smaller. Thus, the metal of the organometallic compounds is more preferably titanium from the viewpoint of an improvement of the adhesive layer in adhesion water-resistance.

When the adhesion-improving layer formed on the polarizer in the present invention includes, as an organometallic compound, a metal alkoxide, it is preferred to use a metal alkoxide having an organic group having 3 or more carbon atoms. The organic group more preferably contains 6 or more carbon atoms. If the number of the carbon atoms therein is 2 or less, the composition for forming the adhesion-improving layer may become short in pot life and further the adhesion water-resistance improving effect may be lowered. The organic group having 6 or more carbon atoms is, for example, an octoxy group. This group is preferably usable. Preferred examples of the metal alkoxide include tetraisopropyl titanate, tetra-n-butyl titanate, a butyl titanate dimer, tetraoctyl titanate, t-amyl titanate, tetra-t-butyl titanate, tetrastearyl titanate, zirconium tetraisopropoxide, zirconium tetra-n-butoxide, zirconium tetraoctoxide, zirconium tetra-t-butoxide, zirconium tetrapropoxide, aluminum sec-butylate, aluminum ethylate, aluminum isopropylate, aluminum butylate, aluminum diisopropylate mono-sec-butyrate, and mono-sec-butoxyaluminum diisopropylate. Out of these examples, tetra-octyl titanate is preferred.

When the composition for forming the adhesive layer includes, as an organometallic compound, a metal chelate, it is preferred that the composition includes a metal chelate having an organic group having 3 or more carbon atoms. If the number of the carbon atoms therein is 2 or less, the composition for forming the adhesion-improving layer may become short in pot life and further the adhesion water-resistance improving effect of the polarizing film may be lowered. The organic group having 3 or more carbon atoms is, for example, an acetylacetonate, ethylacetoacetate, isostearate, or octyleneglycolate group. Out of these examples, the organic group is preferably an acetylacetonate or ethylacetoacetate from the viewpoint of an improvement of the adhesive layer in adhesion water-resistance. Preferred examples of the metal chelate include titanium acetylacetonate, titanium octyleneglycolate, titanium tetraacetylacetonate, titanium ethylacetoacetate, polyhydroxytitanium stearate, dipropoxy-bis (acetylacetonato) titanium, dibutoxytitanium-bis(octyleneglycolate), dipropoxytitanium-bis(ethylacetoacetate), titanium lactate, titanium diethanolaminate, titanium triethanolaminate, dipropoxytitanium-bis(lactate), dipropoxytitanium-bis(triethanolaminate), di-n-butoxytitanium-bis(triethanolaminate), tri-n-butoxytitanium monostearate, diisopropoxy.bis (ethylacetoacetate) titanium, diisopropoxy.bis(acetylacetate) titanium, diisopropoxy.bis(acetylacetone) titanium, titanium phosphate compounds, a titanium lactate ammonium salt, titanium-1,3-propanedioxybis(ethylacetoacetate), a titanium dodecylbenzenesulfonate compound, titanium aminoethyl-aminoethanolate, zirconium tetraacetylacetonate, zirconium monoacetylacetonate, zirconium bisacetylacetonate, zirconium acetylacetonate bisethylacetoacetate, zirconium acetate, tri-n-butoxyethylacetoacetate zirconium, di-n-butoxybis(ethylacetoacetate) zirconium, n-butoxytris(ethylacetoacetate) zirconium, tetrakis(n-propylacetoacetate) zirconium, tetrakis(acetylacetoacetate) zirconium, tetrakis (ethylacetoacetate) zirconium, aluminum ethylacetoacetate, aluminum acetylacetonate, aluminum acetylacetonatebis-ethylacetoacetate, diisopropoxyethylacetoacetate aluminum, diisopropoxyacetylacetonate aluminum, isopropoxybis (ethylacetoacetate) aluminum, isopropoxybis(acetylacetonate) aluminum, tris(ethylacetoacetate) aluminum, tris (acetylacetonate) aluminum, and monoacetylacetonate.bis (ethylacetoacetate) aluminum. Out of these examples, titanium acetylacetonate, and titanium ethylacetoacetate are preferred.

Examples of the organometallic compound usable in the present invention include, besides the above-mentioned compounds, zinc octoate, zinc laurate, zinc stearate, tin octoate, and other organic carboxylic acid metal salts; and acetylacetone zinc chelate, benzoylacetone zinc chelate, dibenzoylmethane zinc chelates, ethyl acetoacetate zinc chelate, and other zinc chelate compounds.

The method for forming an adhesion-improving layer including the organometallic compound onto an adhesion surface of a polarizer before a transparent protective film is laminated onto the polarizer is, for example, a method of producing a composition (A) including the organometallic compound, and forming this composition into a film onto the adhesion surface of the polarizer by, for example, applying. Substances that are other than the organometallic compound and may be included in the composition (A) are, for example, a solvent and an additive.

When the composition (A) includes a solvent, it is allowable to apply the composition (A) onto the adhesion surface of the polarizer and then optionally subject the resultant into a drying step or a curing treatment (for example, thermal treatment).

The solvent, which may be included in the composition (A), is preferably a solvent capable of stabilizing the organometallic compound to dissolve or disperse the compound. The solvent may be an organic solvent, water, or a mixed solvent of these solvents. The solvent is selected from, for example, the following: ethyl acetate, butyl acetate, 2-hydroxyethyl acetate, and other esters; methyl ethyl ketone, acetone, cyclohexanone, methyl isobutyl ketone, diethyl ketone, methyl-n-propyl ketone, acetylacetone, and other ketones; tetrahydrofuran (THF), dioxane, and other cyclic ethers; n-hexane, cyclohexane, and other aliphatic or alicyclic hydrocarbons; toluene, xylene, and other aromatic hydrocarbons; methanol, ethanol, n-propanol, isopropanol, cyclohexanol, and other aliphatic or alicyclic alcohols; ethylene glycol monomethyl ether, ethylene glycol monoethyl ether, diethylene glycol monoethyl ether, and other glycol ethers; and diethylene glycol monomethyl ether acetate, diethylene glycol monoethyl ether acetate, and other glycol ether acetates.

Examples of the additive, which may be included in the composition (A), include a surfactant, a plasticizer, a tackifier, a low molecular weight polymer, a polymerizable monomer, a surface lubricant, a leveling agent, an antioxidant, a corrosion inhibitor, a light stabilizer, an ultraviolet absorber, a polymerization inhibitor, a silane coupling agent, a titanium coupling agent, an inorganic or organic filler, a metal powder, and a particulate or foil material.

If the content of the organometallic compound in the adhesion-improving layer is too small, the proportion of the organometallic compound that is present in the adhesion-improving layer surface is lowered so that the adhesion-improving effect may fall. Thus, the content of the organometallic compound in the adhesion-improving layer is preferably 1% or more, more preferably 20% or more, even more preferably 40% or more by weight.

In the present invention, the adhesion-improving layer may include, together with the organometallic compound, a polymerizable compound having a molecular structure coordinatable to a metallic atom and a polymerizable functional group from the viewpoint of an improvement of the organometallic compound in the adhesion-improving layer in liquid stability.

<Polymerizable Compound Having Molecular Structure Coordinatable to Metallic Atom and Polymerizable Functional Group>

In the polymerizable compound, the molecular structure coordinatable to a metallic atom is a molecular structure such as a hydroxyl, carbonyl, carboxyl, amino, carbene, phenyl, phosphine, sulfide, or sulfoxide group. Preferred is a carboxyl group. The polymerizable compound may include one polymerizable functional group and one carboxyl group, or may include two or more polymerizable functional groups and two or more carboxyl groups.

The polymerizable functional group(s) is/are not particularly limited. Examples thereof include carbon-carbon double bond containing groups, and epoxy, oxetanyl and vinyl ether groups.

The polymerizable functional group(s) is/are (each) in particular preferably a radical polymerizable functional group represented by the following general formula (I):

$$H_2C=C(R^1)-COO- \quad (1)$$

wherein $R^1$ represents hydrogen or an organic group having 1 to 20 carbon atoms; or the following general formula (II):

$$H_2C=C(R^2)-R^3- \quad (II)$$

wherein $R^1$ represents hydrogen or an organic group having 1 to 20 carbon atoms, and $R^3$ represents a direct bond, or an organic group having 1 to 20 carbon atoms. Particularly preferred is a radical polymerizable functional group in which $R^1$ and $R^2$ are each hydrogen or a methyl group.

In the polymerizable compound having a polymerizable functional group and a carboxyl group, a position to which the carboxyl group is bonded is not particularly limited. From the viewpoint of an improvement of the organometallic compound in the composition in liquid stability, a radical polymerizable compound in which a radical polymerizable functional group is bonded to a carboxyl group to interpose, therebetween, an organic group that has 1 to 20 carbon atoms and may contain oxygen is more preferred than (meth)acrylic acid, in which a radical polymerizable functional group is directly to a carboxyl group.

From the viewpoint of an improvement of the organometallic compound in the composition in liquid stability, it is preferred that: the molecular weight of the polymerizable compound having a polymerizable functional group and a carboxyl group is large; when this polymerizable compound is bonded and/or coordinated to the organometallic compound, the polymerizable compound is bulky; and when a different ligand is coordinated thereto, the polymerizable compound gives a steric hindrance. Thus, the molecular weight of the polymerizable compound having a polymerizable functional group and a carboxyl group is 100 g/mol or more, more preferably 125 g/mol or more, in particular preferably 150 g/mol or more. The upper limit of the polymerizable compound having a polymerizable functional group and a carboxyl group is not particularly limited, and is, for example, about 300 g/mol.

From the viewpoint of an improvement of the organometallic compound in the composition in liquid stability, the polymerizable compound having a polymerizable functional group and a carboxyl group is preferably a polymerizable compound having a polymerizable functional group and a carboxyl group to interpose, therebetween, an organic group that has 1 to 20 carbon atoms and may contain oxygen. Examples of such an organic group include alkyl, alkenyl, alkynyl, alkylidene, alicyclic, unsaturated alicyclic, alkyl ester, aromatic ester, acyl, hydroxyalkyl, and alkylene oxide groups. About such organic groups, a single organic group may be present, or the same plural organic groups may be bonded to each other, or different organic groups may be bonded to each other. Specific examples of the polymerizable compound (B) include β-carboxyethyl acrylate, carboxypentyl acrylate, β-carboxyethyl methacrylate, 2-acryloyloxyethyl-succinic acid, 2-acryloyloxyethylhexahydrophthalic acid, 2-acryloyloxyethyl phthalate, ω-carboxy-polycaprolactone monoacrylate, 2-acryloyloxyethyltetrahydrophthalic acid, 2-acryloyloxypropyloxy phthalate, 2-acryloyloxypropyltetrahydrophthalic acid, 2-acryloyloxypropylhexahydrophthalic acid, methacryloyloxyethylsuccinic acid, methacryloyloxyethylphthalic acid, methacryloyloxyethyltetrahydrophthalic acid, methacryloyloxyethylhexahydrophthalic acid, 2-methacryloyloxypropyloxyphthalic acid, 2-methacryloxypropyltetrahydrophthalic acid, and 2-methacryloxypropylhexahydrophthalic acid.

When the total amount of the organometallic compound in the adhesive composition is regarded as a (mol), the content of the polymerizable compound having a polymerizable functional group and a carboxyl group is preferably 0.25a (mol) or more, more preferably 0.35a (mol) or more, in particular preferably 0.5a (mol) or more from the viewpoint of an improvement of the organometallic compound in the composition in liquid stability. If the content of the polymerizable compound having a polymerizable functional group and a carboxyl group is less than 0.25a (mol), the stabilization of the organometallic compound becomes insufficient so that hydrolysis reaction and self-condensation reaction thereof advance. Consequently, the pot life of the resultant polarizing film may be shortened.

In the polarizing film according to the present invention, a polarizer and a transparent protective film are laminated to each other to interpose an adhesive layer therebetween. This adhesive layer is formed by curing a curable resin composition. The form of curing the curable resin composition can be roughly classified into a thermosetting, or active energy ray curing form. Examples of a resin in the thermosetting form include polyvinyl alcohol resin, epoxy resin, unsaturated polyester, urethane resin, acrylic resin, urea resin, melamine resin, and phenolic resin. As required, a curing agent is together used. The thermosetting resin is more preferably polyvinyl alcohol resin or epoxy resin. Resins in the active energy ray curable form can be roughly classified into electron beam curable, ultraviolet curable and visible ray curable forms according to classification based on an active energy ray therefor. In accordance with the form of the curing, the curable resin composition can be divided into a radical polymerization curable resin composition and a cationic polymerization curable resin composition. In the present invention, any active energy ray having a wavelength in a range of 10 to 380 nm is described as an ultraviolet ray; and any active energy ray having a wavelength in a range from 380 to 800 nm, as a visible ray.

In the production of the polarizing film according to the present invention, the curable resin composition is preferably in an active energy ray curable form as described above. The composition is in particular preferably in a visible ray curable form, which makes use of visible rays in a wavelength range from 380 to 450 nm.

<1: Radical Polymerization Curable Resin Composition>

A curable component included in the radical polymerization curable resin composition is, for example, a radical polymerizable compound used in any radical polymerization curable resin composition. The radical polymerizable compound is, for example, a compound having a radical polymerizable functional group of a carbon-carbon double bond, such as a methacryloyl group or a vinyl group. Such a curable component may be either a monofunctional radical polymerizable compound, or a bifunctional or higher polyfunctional radical polymerizable compound. Such radical polymerizable compounds may be used singly, or in any combination of two or more thereof. The radical polymerizable compound(s) is/are (each), for example, a compound having a (meth)acryloyl group. In the present invention, the word "(meth)acryloyl" denotes an acryloyl group and/or a methacryloyl group. The notation "(meth)a" has substantially the same meanings hereinafter.

<<Monofunctional Radical Polymerizable Compound>>

The monofunctional radical polymerizable compound is, for example, a compound represented by the following general formula (2):

[Formula 8]

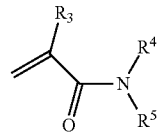

(2)

wherein $R^3$ is a hydrogen atom or a methyl group, and $R^4$ and $R^5$ are each independently a hydrogen atom, or an alkyl, hydroxyalkyl, alkoxyalkyl or cyclic ether group, and $R^4$ and $R^5$ may form a cyclic heterocycle. The number of carbon atoms in the alkyl moiety of (each of) the alkyl, hydroxyalkyl, and/or alkoxyalkyl group(s) is not particularly limited, and is, for example, from 1 to 4. The cyclic heterocycle, which $R^4$ and $R^5$ may form, is, for example, an N-acryloylmorpholine.

Specific examples of the compound represented by the general formula (2) include N-methyl(meth)acrylamide, N,N-dimethyl(meth)acrylamide, N,N-diethyl(meth)acrylamide, N-isopropyl(meth)acrylamide, N-butyl(meth)acrylamide, N-hexyl(meth)acrylamide, and other N-alkyl-group-containing (meth) acrylamide derivatives; N-methylol (meth)acrylamide, N-hydroxyethyl(meth)acrylamide, N-methylol-N-propane(meth)acrylamide, and other N-hydroxyalkyl-group-containing (meth) acrylamide derivatives; and N-methoxymethylacrylamide, N-ethoxymethylacrylamide, and other N-alkoxy-group-containing (meth) acrylamide derivatives. The cyclic-ether-group-containing (meth) acrylamide derivative is, for example, a heterocycle-containing (meth)acrylamide derivative in which a nitrogen atom of a (math) acrylamide group forms a heterocycle. Examples thereof include N-acryloylmorpholine, N-acryloylpiperidine, N-methacryloylpiperidine, and N-acryloylpyrrolidine. Out of these examples, N-hydroxyethylacrylamide and N-acryloylmorpholine are preferred since these compounds are excellent in reactivity, can each give a cured product with a high elastic modulus, and the resultant adhesive layer is excellent in adhesion to the polarizer.

From the viewpoint of an improvement of the polarizer and the adhesive layer in adhesion therebetween and in water respective, in particular, from the viewpoint of an improvement in the adhesion and the water resistance when the polarizer and the transparent protective film are bonded to each other through the adhesive layer, the content of the compound represented by the general formula (2) in the curable resin composition is preferably from 0.01 to 80%, more preferably from 5 to 40% by weight.

The curable resin composition used in the present invention may contain, besides the compound represented by the general formula (2), a different monofunctional radical polymerizable compound as a curable component. Examples of the monofunctional radical polymerizable compound include various (meth) acrylic acid derivatives each having a (meth) acryloyloxy group. Specific examples thereof include methyl (meth)acrylate, ethyl (meth)acrylate, n-propyl (meth)acrylate, isopropyl (meth) acrylate, 2-methyl-2-nitropropyl (meth)acrylate, n-butyl (meth)acrylate, isobutyl (meth)acrylate, s-butyl (meth)acrylate, t-butyl (meth)acrylate, n-pentyl (meth)acrylate, t-pentyl (meth)acrylate, 3-pentyl (meth)acrylate, 2,2-dimethylbutyl (meth)acrylate, n-hexyl (meth)acrylate, cetyl (meth)acrylate, n-octyl (meth) acrylate, 2-ethylhexyl (meth) acrylate, 4-methyl-2-propylpentyl (meth) acrylate, n-octadecyl (meth)acrylate, and other ($C_1$ to $C_{20}$) alkyl (meth)acrylates.

Examples of the above-mentioned (meth)acrylic acid derivatives include cyclohexyl (meth)acrylate, cyclopentyl (meth)acrylate, and other cycloalkyl (meth)acrylates; benzyl (meth)acrylate, and other aralkyl (meth)acrylates; 2-isobornyl (meth)acrylate, 2-norbornylmethyl (meth)acrylate, 5-norbornene-2-yl-methyl (meth) acrylate, 3-methyl-2-norbornylmethyl (meth) acrylate, dicyclopentenyl (meth) acrylate, dicyclopentenyloxyethyl (meth) acrylate, dicyclopentanyl (meth)acrylate, and other polycyclic (meth) acrylates; and 2-methoxyethyl (meth) acrylate, 2-ethoxyethyl (meth) acrylate, 2-methoxymethoxyethyl (meth) acrylate, 3-methoxybutyl (meth) acrylate, ethylcarbitol (meth)acrylate, phenoxyethyl (meth)acrylate, alkylphenoxy polyethylene glycol (meth)acrylate, and other alkoxy-group or phenoxy-group-containing (meth)acrylates. Out of these examples, preferred are dicyclopentenyloxyethyl acrylate and phenoxyethyl acrylate since the resultant adhesive layer is excellent in various protective films.

Examples of the above-mentioned (meth)acrylic derivatives include 2-hydroxyethyl (meth)acrylate, 2-hydroxypropyl (meth) acrylate, 3-hydroxypropyl (meth) acrylate, 2-hydroxybutyl (meth) acrylate, 4-hydroxybutyl (meth) acrylate, 6-hydroxyhexyl (meth) acrylate, 8-hydroxyoctyl (meth) acrylate, 10-hydroxydecyl (meth)acrylate, 12-hydroxylauryl (meth)acrylate, and other hydroxyalkyl (meth) acrylates; [4-(hydroxymethyl)cyclohexyl]methyl acrylate, cyclohexanedimethanol mono(meth)acrylate, 2-hydroxy-3-phenoxypropyl (meth) acrylate, and other hydroxyl-group-containing (meth) acrylates; glycidyl (meth) acrylate, 4-hydroxybutyl (meth) acrylate glycidyl ether, and other epoxy-group-containing (meth)acrylates; 2,2,2-trifluoroethyl (meth)acrylate, 2,2,2-trifluoroethyl (meth) acrylate, tetrafluoropropyl (meth) acrylate, hexafluoropropyl (meth) acrylate, octafluoropentyl (meth) acrylate, heptadecafluorodecyl (meth) acrylate, 3-chloro-2-hydroxypropyl (meth) acrylate, and other halogen-containing (meth) acrylates; dimethylaminoethyl (meth)acrylate, and other alkylaminoalkyl (meth)acrylates; 3-oxetanylmethyl (meth) acrylate, 3-methyloxetanylmethyl (meth) acrylate, 3-ethyl-oxetanylmethyl (meth) acrylate, 3-butyl-oxetanylmethyl (meth) acrylate, 3-hexyl-oxetanylmethyl (meth)acrylate, and other oxetane-group-containing (meth)acrylates; tetrahydrofurfuryl (meth)acrylate, butyrolactone (meth)acrylate, and other heterocycle-having (meth)acrylates; and a (meth)acrylic acid adduct of neopentylglycol hydroxypivalate, and p-phenylphenol (meth)acrylate. Out of these examples, 2-hydroxy-3-phenoxypropyl acrylate is preferred since the adhesive layer is excellent in adhesion to various protective films.

Examples of the monofunctional radical polymerizable compound include (meth)acrylic acid, carboxyethyl acrylate, carboxypentyl acrylate, itaconic acid, maleic acid, fumaric acid, crotonic acid, isocrotonic acid, and other carboxyl-group-containing monomers.

Other examples of the monofunctional radical polymerizable compound include N-vinylpyrrolidone, N-vinyl-c-caprolactam, methylvinylpyrrolidone, and other lactam-based vinyl monomers; vinylpyridine, vinylpiperidone, vinylpyrimidine, vinylpiperazine, vinylpyrazine, vinylpyrrole, vinylimidazole, vinyloxazole, vinylmorpholine, and other vinyl monomers each having a nitrogen-containing heterocycle.

In the case of incorporating, into the curable resin composition used in the present invention, for example, a hydroxyl-group-containing (meth) acrylate, a carboxyl-group-containing (meth)acrylate, or a phosphate-group-containing (meth)acrylate, which are high in polarity, out of monofunctional radical polymerizable compounds, the resultant cured product layer is improved in adhesion in various substrates. The content of the hydroxyl-group-containing (meth)acrylate is preferably from 1 to 30% by weight of the resin composition. If the content is too large, the cured product may become high in water absorption coefficient to be deteriorated in water resistance. The content of the carboxyl-group-containing (meth)acrylate is preferably from 1 to 20% by weight of the resin composition. If the content is too large, the polarizing film is unfavorably lowered in optical endurance. The phosphate-group-containing (meth)acrylate is, for example, 2-(meth)acryloyloxyethyl acid phosphate. The content thereof is preferably from 0.1 to 10% by weight of the resin composition. If the content is too large, the polarizing film is unfavorably lowered in optical endurance.

The monofunctional radical polymerizable compound may also be a radical polymerizable compound having an active methylene group. The radical polymerizable compound having an active methylene group is a compound having, at a terminal thereof or in the molecule thereof, an active double bond group such as a (meth)acryl group, and further having an active methylene group. Examples of the active methylene group include acetoacetyl, alkoxymalonyl, and cyanoacetyl groups. The active methylene group is preferably an acetoacetyl group. Specific examples of the radical polymerizable compound having an active methylene group include 2-acetoacetoxyethyl (meth) acrylate, 2-acetoacetoxypropyl (meth) acrylate, 2-acetoacetoxy-1-methylethyl (meth) acrylate, and other acetoacetoxyalkyl (meth) acrylates; and 2-ethoxymalonyloxyethyl (meth) acrylate, 2-cyanoacetoxyethyl (meth) acrylate, N-(2-cyanoacetoxyethyl)acrylamide, N-(2-propionylacetoxybutyl)acrylamide, N-(4-acetoacetoxymethylbenzyl)acrylamide, and N-(2-acetoacetylaminoethyl)acrylamide. The radical polymerizable compound having an active methylene group is preferably an acetoacetoxyalkyl (meth)acrylate.

<<Polyfunctional Radical Polymerizable Compound>>

Examples of the bi- or higher polyfunctional radical polymerizable compound include N,N'-methylenebis(meth) acrylamide, which is a polyfunctional (meth)acrylamide derivative, tripropylene glycol di(meth)acrylate, tetraethylene glycol di(meth)acrylate, 1,6-hexanediol di(meth)acrylate, 1,9-nonanediol di(meth)acrylate, 1,10-decanediol diacrylate, 2-ethyl-2-butylpropanediol di(meth)acrylate, bisphenol A di(meth)acrylate, bisphenol A ethylene oxide adduct di(meth)acrylate, bisphenol A propylene oxide adduct di(meth)acrylate, bisphenol A diglycidyl ether di(meth)acrylate, neopentyl glycol di(meth)acrylate, tricyclodecanedimethanol di(meth)acrylate, cyclic trimethylolpropaneformal (meth) acrylate, dioxane glycol di(meth) acrylate, trimethylolpropane tri(meth)acrylate, pentaerythritol tri(meth)acrylate, pentaerythritol tetra(meth) acrylate, dipentaerythritol penta(meth)acrylate, dipentaerythritol hexa(meth)acrylate, EO-modified diglycerin tetra(meth)acrylate, and other esterified products each made from (meth)acrylic acid and a polyhydric alcohol, and 9,9-bis[4-(2-(meth)acryloyloxyethoxy)phenyl]fluorene.

Preferred and specific examples thereof include ARONIX M-220 (manufactured by Toagosei Co., Ltd.), LIGHT ACRYLATE 1,9 ND-A (manufactured by Kyoeisha Chemical Co., Ltd.), LIGHT ACRYLATE DGE-4A (manufactured by Kyoeisha Chemical Co., Ltd.), LIGHT ACRYLATE DCP-A (manufactured by Kyoeisha Chemical Company, Ltd.), SR-531 (manufactured by a company Sartomer Co.), and CD-536 (manufactured by the company Sartomer). As the need arises, for example, the following are used: various epoxy (meth)acrylates, urethane (meth)acrylates, polyester (meth)acrylates, and various (meth)acrylate-based monomers. A polyfunctional (meth)acrylamide derivative is preferably incorporated into the curable resin composition since the derivative gives a large polymerization rate to give an excellent producing performance, and further at the time of making the resin composition into a cured product the derivative gives an excellent crosslinking performance.

As such radical polymerizable compounds, the monofunctional radical polymerizable compound and the polyfunctional radical polymerizable compound are preferably used together with each other in order to make the following compatible with each other: adhesion of the resultant layer to the polarizer and various transparent protective films; and the optical endurance of the polarizing film in a severe environment. It is usually preferred to use the monofunctional radical polymerizable compound in a proportion of 3 to 80% by weight of the radical polymerizable compounds, and the polyfunctional radical polymerizable compound in a proportion of 20 to 97% by weight thereof.

<Embodiments of Radical Polymerization Curable Resin Composition>

The curable resin composition used in the present invention is usable as an active-energy-ray-curable resin composition when the curable component of this composition is used as an active energy ray curable component. When an electron beam or the like is used as the active energy ray, the active-energy-ray-curable resin composition does not need to contain any photopolymerization initiator. When an ultraviolet ray or visible ray is used as the active energy ray, this composition preferably contains a photopolymerization initiator.

<<Photopolymerization Initiator>>

When the above-mentioned radical polymerizable compound is used, the photopolymerization initiator is appropriately selected in accordance with the active energy ray. When the compound is cured by an ultraviolet ray or visible ray, an ultraviolet or visible-ray-cleavable photopolymerization initiator is used. Examples of this photopolymerization initiator include benzil, benzophenone, benzoyl benzoic acid, 3,3'-dimethyl-4-methoxybenzophenone, and other benzophenone compounds; 4-(2-hydroxyethoxy)phenyl (2-hydroxy-2-propyl) ketone, $\alpha$-hydroxy-$\alpha,\alpha'$-dimethylacetophenone, 2-methyl-2-hydroxypropiophenone, $\alpha$-hydroxycyclohexyl phenyl ketone, and other aromatic ketone compounds; methoxyacetophenone, 2,2-dimethoxy-2-phenylacetophenone, 2,2-diethoxyacetophenone, 2-methyl-1-[4-(methylthio)-phenyl]-2-morpholinopropane-1, and other acetophenone compounds; benzoin methyl ether, benzoin ethyl ether, benzoin isopropyl ether, benzoin butyl ether, anisoin methyl ether, and other benzoin ether compounds; benzyl dimethyl ketal, and other aromatic ketal compounds; 2-naphthalenesulfonyl chloride, and other aromatic sulfonyl chloride compounds; 1-phenone-1,1-propanedione-2-(o-ethoxycarbonyl) oxime, and other optically active oxime compounds; thioxanthone, 2-chlorothioxanthone, 2-methylthioxanthone, 2,4-dimethylthioxanthone, isopropylthioxanthone, 2,4-dichlorothioxanthone, 2,4-diethylthioxanthone, 2,4-diisopropylthioxanthone, dodecylthioxanthone, and other thioxanthone compounds; camphorquinone; halogenated ketones; and acylphosphonoxide; and acylphosphonate.

The blend amount of the photopolymerization initiator is 20% or less by weight of the whole of the curable resin composition. The blend amount of the photopolymerization initiator is preferably from 0.01 to 20%, more preferably from 0.05 to 10%, even more preferably from 0.1 to 5% by weight thereof.

When the curable resin composition used in the present invention is used as a visible ray curable composition including, as a curable component thereof, a radical polymerizable compound, it is preferred to use a photopolymerization initiator high in sensitivity, particularly, to light rays having a wavelength of 380 nm or more. About the photopolymerization initiator high in sensitivity to light rays having a wavelength of 380 nm or more, a description will be made later.

It is preferred to use, as the photopolymerization initiator or such photopolymerization initiators, a compound represented by the following general formula (3) singly:

[Formula 9]

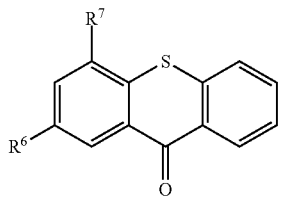

(3)

wherein $R^6$ and $R^7$ each represent —H, —$CH_2CH_3$, -iPr or Cl, and $R^6$ and $R^7$ may be the same as or different from each other; or use the compound represented by the general formula (3) together with a photopolymerization initiator high in sensitivity to light rays having a wavelength of 380 nm or more, which will be detailed later. When the compound represented by the general formula (3) is used, the cured product is better in adhesion than when the photopolymerization initiator high in sensitivity to light rays having a wavelength of 380 nm or more is used singly. Out of compounds each represented by the general formula (3), diethylthioxanthone, in which $R^6$ and $R^7$ are each —$CH_2CH_3$, is particularly preferred. The composition proportion of the compound represented by the general formula (3) in the curable resin composition is preferably from 0.1 to 5%, more preferably from 0.5 to 4%, even more preferably from 0.9 to 3% by weight of the whole of the curable resin composition.

As required, a polymerization initiation aid is preferably added into the composition. Examples of the polymerization initiation aid include triethylamine, diethylamine, N-methyldiethanolamine, ethanolamine, 4-dimethylaminobenzoic acid, methyl 4-dimethylaminobenzoate, ethyl 4-dimethylaminobenzoate, and isoamyl 4-dimethylaminobenzoate. Ethyl 4-dimethylaminobenzoate is particularly preferred. When the polymerization initiation aid is used, the addition amount thereof is usually from 0 to 5%, preferably from 0 to 4%, most preferably from 0 to 3% by weight of the whole of the curable resin composition.

As required, a known photopolymerization initiator may be together used. A transparent protective film having a UV absorbing power does not transmit any light ray of 380 nm or less wavelengths. Thus, it is preferred to use, as the photopolymerization initiator, a photopolymerization initiator high in sensitivity to light rays of 380 nm or more wavelength. Specific examples thereof include 2-methyl-1-(4-methylthiophenyl)-2-morpholinopropane-1-one, 2-benzyl-2-dimethylamino-1-(4-morpholinophenyl)-butanone-1, 2-(dimethylamino)-2-[(4-methylphenyl)methyl]-1-[4-(4-morpholinyl)phenyl]-1-butanone, 2,4,6-trimethylbenzoyl-diphenyl-phosphine oxide, bis(2,4,6-trimethylbenzoyl)-phenylphosphine oxide, bis(15-2,4-cyclopentadiene-1-yl)-bis(2,6-difluoro-3-(1H-pyrrol-1-yl)-phenyl)titanium.

It is particularly preferred that in addition to the photopolymerization initiator of the general formula (3), a compound represented by the following general formula (4) is used as another photopolymerization initiator:

[Formula 10]

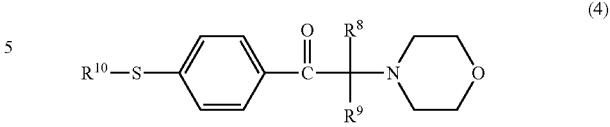

(4)

wherein, $R^8$, $R^9$ and $R^{10}$ each represent —H, —$CH_3$, —$CH_2CH_3$, -iPr or Cl, and $R^8$, $R^9$ and $R^{10}$ may be the same or different. A preferably usable example of the compound represented by the general formula (4) is 2-methyl-1-(4-methylthiophenyl)-2-morpholinopropane-1-one, which is also a commercially available product (trade name: IRGACURE 907, manufacturer: the company BASF). Additionally, the following are preferred because of high sensitivity thereof:
2-benzyl-2-dimethylamino-1-(4-morpholinophenyl)-butanone-1 (trade name: IRGACURE 369, manufacturer: the BASF), 2-(dimethylamino)-2-[(4-methylphenyl)methyl]-1-[4-(4-morpholinyl)phenyl]-1-butanone (trade name: IRGACURE 379, manufacturer: the BASF).

<Radical Polymerizable Compound Having Active Methylene Group, and Radical Polymerization Initiator Having Hydrogen-Withdrawing Effect>

In the case of using, as the radical polymerizable compound, a radical polymerizable compound having an active methylene group in the active-energy-ray-curable resin composition, it is preferred to use a combination of this compound with a radical polymerization initiator having hydrogen-withdrawing effect. This structure makes a remarkable improvement of the adhesive layer, which the polarizing film has, in adhesion even immediately after the polarizing film is taken out, particularly, from a high-humidity environment or water (even when the film is in a non-dry state). Reasons therefor are unclear. However, the improvement would be based on the following causes: While the radical polymerizable compound having an active methylene group is polymerized together with the other radical polymerizable compounds that will be included in the adhesive layer, the compound is taken into a main chain and/or side chains of a base polymer in the adhesive layer to form the adhesive layer. In this polymerizing step, in the presence of the radical polymerization initiator having hydrogen-withdrawing effect, the base polymer, which will be included in the adhesive layer, is formed and simultaneously hydrogen is withdrawn from the active-methylene-having radical polymerizable compound to generate radicals in methylene groups of molecules of the compound. The methylene groups in which radicals are generated react with hydroxyl groups of the polarizer, such as ones of PVA, so that covalent bonds are formed between the adhesive layer and the polarizer. Consequently, the adhesive layer which the polarizing film has would be remarkably improved in adhesion even when the polarizing film is, particularly, in a non-dry state.

In the present invention, the radical polymerization initiator having hydrogen-withdrawing effect is, for example, a thioxanthone-based radical polymerization initiator, or a benzophenone-based radical polymerization initiator. The radical polymerization initiator is preferably a thioxanthone-based radical polymerization initiator. The thioxanthone-based radical polymerization initiator is, for example, a compound represented by the general formula (3). Specific examples of the compound represented by the general formula (3) include thioxanthone, dimethylthioxanthone, diethylthioxanthone, isopropylthioxanthone, and chlorothioxanthone. Out of compounds represented by the general formula (3), preferred is diethylthioxanthone, in which $R^6$ and $R^7$ are each —$CH_2CH_3$.

When the active-energy-ray-curable resin composition contains the radical polymerizable compound having an active methylene group and the radical polymerization initiator having hydrogen-withdrawing effect, it is preferred that the radical polymerizable compound having an active methylene group is contained in a proportion of 1 to 50% by weight of the whole of the curable components, and the radical polymerization initiator is contained in a proportion of 0.1 to 10% by weight of the whole.

As described above, in the present invention, radicals are generated in methylene groups of molecules of the active-methylene-group-having radical polymerizable compound in the presence of the radical polymerization initiator having hydrogen-withdrawing effect. The methylene groups react with hydroxyl groups of the polarizer, such as ones of PVA, to form covalent bonds. Thus, in order to generate radicals in the methylene groups of the molecules of the active-methylene-group-having radical polymerizable compound to form covalent bonds sufficiently, the active-methylene-group-having radical polymerizable compound is incorporated into the composition preferably in a proportion of 1 to 50%, more preferably in a proportion of 3 to 30% by weight of the whole of the curable components. In order to improve the adhesive layer in water resistance sufficiently to improve this layer in adhesion in a non-dry state, the proportion of the active-methylene-group-having radical polymerizable compound is set preferably to 1% or more by weight. In the meantime, if the proportion is more than 50% by weight, the adhesive layer may be poorly cured. The radical polymerization initiator having hydrogen-withdrawing effect is contained preferably in a proportion of 0.1 to 10%, more preferably in a proportion of 0.3 to 9% by weight of the whole of the curable resin composition. In order to cause the hydrogen-withdrawing reaction sufficiently, the radical polymerization initiator is used in a proportion of 0.1% or more by weight. In the meantime, if the proportion is more than 10% by weight, the initiator may not be completely dissolved in the composition.

<2: Cation Polymerization Curable Adhesive Composition>

The cation polymerizable compound used in the cation polymerization curable resin composition is classified into a monofunctional cation polymerizable compound, which has in the molecule thereof a single cation polymerizable functional group, or a polyfunctional cation polymerizable compound, which has in the molecule thereof two or more cation polymerizable functional groups. The monofunctional cation polymerizable compound is relatively low in liquid viscosity; thus, when this compound is incorporated into the resin composition, the resin composition can be lowered in liquid viscosity. Moreover, in many cases, the monofunctional cation polymerizable compound has a functional group for expressing various functions. Thus, the incorporation of this compound into the resin composition can cause various functions to be expressed in the resin composition and/or a cured product of the resin composition. The polyfunctional cation polymerizable compound allows to crosslink the cure product of the resin composition three-dimensionally. Thus, this compound is preferably incorporated into the resin composition. About the ratio between the monofunctional cation polymerizable compound and the polyfunctional cation polymerizable compound, the latter is preferably blended into the former in an amount of 10 to 100 parts by weight for 100 parts by weight of the former. The cation polymerizable functional group may be an epoxy, oxetanyl or vinyl ether group. Examples of a compound having this epoxy group include aliphatic epoxy compounds, alicyclic epoxy compounds, and aromatic epoxy compounds. The cation polymerization curable resin composition in the present invention in particular preferably contains an alicyclic epoxy compound since the composition is excellent in curability and adhesion. Examples of the alicyclic epoxy compound include 3, 4-epoxycyclohexylmethyl-3, 4-epoxycyclohexane carboxylate, and caprolactone-modified products, trimethyl caprolactone modified products or valerolactone-modified products of 3, 4-epoxycyclohexylmethyl-3, 4-epoxycyclohexane carboxylate. Specific examples thereof include products CELLOXIDE 2021, CELLOXIDE 2021A, CELLOXIDE 2021P, CELLOXIDE 2081, CELLOXIDE 2083, CELLOXIDE 2085 (each manufactured by Daicel Corp); and CYRACURE UVR-6105, CYRACURE UVR-6107, CYRACURE 30, and R-6110 (manufactured by Dow Chemical Japan Ltd.). It is preferred to incorporate a compound having the above-mentioned oxetanyl group into the cation polymerizable curable resin composition of the present invention since the compound has advantageous effects of improving the composition in curability and lower the composition in liquid viscosity. Examples of the oxetanyl-group-having compound include 3-ethyl-3-hydroxymethyloxetane, 1,4-bis[(3-ethyl-3-oxetanyl)methoxymethyl]benzene, 3-ethyl-3-(phenoxymethyl)oxetane, di[(3-ethyl-3-oxetanyl)methyl] ether, 3-ethyl-3-(2-ethylhexyloxymethyl)oxetane, and phenol novolac oxetane. The following are commercially available: products ARON OXETANE OXT-101, ARON OXETANE OXT-121, ARON OXETANE OXT-211, ARON OXETANE OXT-221, and ARON OXETANE OXT-212 (manufactured by Toagosei Co., Ltd.). The compound having the above-mentioned vinyl ether group has an effect of improving the cation polymerization curable resin composition in curability or lowering the composition in liquid viscosity; thus, this compound is preferably incorporated into the composition. Examples of the vinyl-ether-group-having compound include 2-hydroxyethyl vinyl ether, diethylene glycol monovinyl ether, 4-hydroxybutyl vinyl ether, diethylene glycol monovinyl ether, triethylene glycol divinyl ether, cyclohexanedimethanol divinyl ether, cyclohexanedimethanol monovinyl ether, tricyclodecane vinyl ether, cyclohexyl vinyl ether, methoxyethyl vinyl ether, ethoxyethyl vinyl ether, and pentaerythritol type tetravinyl ether.

<Cation Photopolymerization Initiator>

The cation polymerization curable resin composition includes, as a curable component, at least one compound selected from the above-mentioned epoxy-group-having compound, the oxetanyl-group-having compound and the vinyl-ether-group-having compound, and these compounds are each cured by cation polymerization. Thus, a cation photopolymerization initiator is blended into the composition. This cation photopolymerization initiator is irradiated with an active energy ray such as a visible ray, an ultraviolet ray, an X ray or an electron beam to generate a cationic species or Lewis acid to initiate the polymerization reaction of epoxy groups and oxetanyl groups. The cation photopolymerization initiator is preferably an optical acid generator which will be detailed later. When the curable resin composition used in the present invention is used in a visible ray curable form, it is particularly preferred to use a cation photopolymerization initiator high in sensitivity to light rays having wavelengths of 380 nm or more. In general, cation photopolymerization initiators are each a compound showing a maximum absorption near 300 nm or in the range of wavelengths shorter than 300 nm. Thus, by blending, into the composition, a photosensitizer showing a maximum absorption in the range of wavelengths longer than 300 nm, specifically, wavelengths longer than 380 nm, the photosensitizer sensitizes light rays each having a wavelength near this wavelength so that the generation of a cation species or acid can be promoted from the cation photopolymerization initiator. Examples of the photosensitizer include anthracene compounds, pyrene compounds, carbonyl compounds, organic sulfur compounds, persulfates, redox compounds, azo and diazo compounds, halogenated compounds, and optically reducible colorants. These photosensitizers may be used in the form of a mixture of two or more thereof. In particular, anthracene compounds are preferred because of an excellent photosensitizing effect thereof. Specific examples thereof include products ANTHRACURE UVS-1331, and ANTHRACURE UVS-1221 (manufactured by Kawasaki Kasei Chemicals Co., Ltd.). The content of the photosensitizer(s) is preferably from 0.1 to 5% by weight, more preferably from 0.5 to 3% by weight.

<Other Components>

The curable resin composition used in the present invention preferably contains the following components:

<Acrylic Oligomer>

The active-energy-ray-curable resin composition used in the present invention may contain, besides the curable component related to the above-mentioned radical polymerizable compound, an acrylic oligomer obtained by polymerizing a (meth)acrylic monomer. By incorporating the component into the active-energy-ray-curable resin composition, this composition is decreased in curing shrinkage when irradiated with an active energy ray to be cured, so that interfacial stress can be decreased between the adhesive, and adherends such as a polarizer and a transparent protective film. As a result, the adhesion between the adhesive layer and the adherends can be restrained from being lowered. In order to restrain the curing shrinkage of the cured product layer (adhesive layer) sufficiently, the content of the acrylic oligomer in the curable resin composition is preferably 20% or less, more preferably 15% or less by weight of the whole of the composition. If the content of the acrylic oligomer in the curable resin composition is too large, the composition is intensely lowered in reaction rate when irradiated with an active energy ray. Thus, the composition may be poorly cured. In the meantime, the acrylic oligomer is contained in the curable resin composition in a proportion that is preferably 3% or more, more preferably 5% or more by weight of the whole of the curable resin composition.

The active-energy-ray-curable resin composition is preferably low in viscosity in a case where a consideration is made about the workability or evenness of the composition when the composition is applied. Thus, it is also preferred that the acrylic oligomer, which is obtained by polymerizing a (meth)acrylic monomer, is also low in viscosity. About the acrylic oligomer that is low in viscosity and can prevent the resultant adhesive layer from undergoing curing shrinkage, the weight-average molecular weight (Mw) thereof is preferably 15000 or less, more preferably 10000 or less, in particular preferably 5000 or less. In the meantime, in order to restrain the cured product layer (adhesive layer) sufficiently from undergoing curing shrinkage, the weight-average molecular weight (Mw) of the acrylic oligomer is preferably 500 or more, more preferably 1000 or more, in particular preferably 1500 or more. Specific examples of the (meth)acrylic monomer, from which the acrylic oligomer is made, include methyl (meth)acrylate, ethyl (meth)acrylate, n-propyl (meth)acrylate, isopropyl (meth) acrylate, 2-methyl-2-nitropropyl (meth)acrylate, n-butyl (meth)acrylate, isobutyl (meth)acrylate, S-butyl (meth)acrylate, t-butyl (meth)acrylate, n-pentyl (meth)acrylate, t-pentyl (meth) acrylate, 3-pentyl (meth)acrylate, 2,2-dimethylbutyl (meth) acrylate, n-hexyl (meth)acrylate, cetyl (meth)acrylate, n-octyl (meth) acrylate, 2-ethylhexyl (meth) acrylate, 4-methyl-2-propylpentyl (meth) acrylate, N-octadecyl (meth) acrylate, and other ($C_1$-$C_{20}$) alkyl esters of (meth) acrylic acid; and cycloalkyl (meth)acrylates (such as cyclohexyl (meth)acrylate, and cyclopentyl (meth)acrylate), aralkyl (meth)acrylates (such as benzyl (meth)acrylate), polycyclic (meth) acrylates (such as 2-isobornyl (meth)acrylate, 2-norbornylmethyl (meth) acrylate, 5-norbornene-2-ylmethyl (meth) acrylate, and 3-methyl-2-norbornylmethyl (meth)acrylate), hydroxy-group-containing (meth) acrylates (such as hydroxyethyl (meth)acrylate, 2-hydroxypropyl (meth) acrylate, and 2,3-dihydroxypropylmethyl-butyl (meth) acrylate), alkoxy-group- or phenoxy-group-containing (meth)acrylates (such as 2-methoxyethyl (meth)acrylate, 2-ethoxyethyl (meth) acrylate, 2-methoxymethoxyethyl (meth) acrylate, 3-methoxybutyl (meth) acrylate, ethylcarbitol (meth)acrylate, and phenoxyethyl (meth)acrylate), epoxy group-containing (meth)acrylates (such as glycidyl (meth)acrylate), halogen-containing (meth)acrylates (such as 2,2,2-trifluoroethyl (meth)acrylate, 2,2,2-trifluoroethylethyl (meth) acrylate, tetrafluoropropyl (meth) acrylate, hexafluoropropyl (meth) acrylate, octafluoropentyl (meth) acrylate, and heptadecafluorodecyl (meth)acrylate), and alkylaminoalkyl (meth)acrylates (such as dimethylaminoethyl (meth)acrylate). These (meth)acrylates may be used singly or in combination of two or more thereof. Specific examples of the acrylic oligomer include products "ARUFON" manufactured by Toagosei Co., Ltd., "ACT-FLOW" manufactured by Soken Chemical & Engineering Co., Ltd., and "JONCRYL" manufactured by BASF Japan Ltd.

<Optical Acid Generator>

The active-energy-ray-curable resin composition may contain an optical acid generator. When the active-energy-ray-curable resin composition contains the optical acid generator, the adhesive layer can be dramatically made better in water resistance and endurance when the composition does not contain any optical acid generator. The optical acid generator can be represented by the following general formula (5):

General formula (5)

$$L^+X^-$$ [Formula 11]

wherein $L^+$ represents any onium cation addition, $X^-$ represents a counter ion selected from the group consisting of $PF_6^-$, $SbF_6^-$, $AsF_6^-$, $SbCl_6^-$, $BiCl_5^-$, $SnCl_6^-$, $ClO_4^-$, a dithiocarbamate anion, and $SCN^-$.

Next, a description will be made about the counter anion $X^-$ in the general formula (5).

The counter anion $X^-$ in the general formula (5) is not particularly limited in principle, and is preferably a non-nucleophilic anion. When the counter anion $X^-$ is the non-nucleophilic anion, a nucleophilic reaction is not easily caused with a cation existing therewith in the molecule or various materials used together. As a result, the optical acid generator itself, which is represented by the general formula (4), and a composition using this agent can be improved in stability over time. The non-nucleophilic anion referred to herein denotes an anion low in power for causing nucleophilic reaction. Examples of the anion include $PF_6^-$, $SbF_6^-$, $AsF_6^-$, $SbCl_6^-$, $BiCl_5^-$, $SnCl_6^-$, $ClO_4^-$, a dithiocarbamate anion, and $SCN^-$.

Preferred and specific examples of the optical acid generator in the present invention include products "CYRACURE UVI-6992", and "CYRACURE UVI-6974" (manufactured by Dow Chemical Japan Ltd.), "ADEKA OPTOMER SP150", "ADEKA OPTOMER SP152", "ADEKA OPTOMER SP170", and "ADEKA OPTOMER SP172" (manufactured by ADEKA Corp.), "IRGACURE 250" (manufactured by Ciba Specialty Chemicals Corp.), "CI-5102", and "CI-2855" (manufactured by Nippon Soda Co., Ltd.), "SAN-AID SI-60L", "SAN-AID SI-80L", "SAN-AID SI-100L", "SAN-AID SI-110L", and "SAN-AID SI-180L" (manufactured by Sanshin Chemical Industry Co., Ltd.), "CPI-100P", and "CPI-100A" (manufactured by San-Apro Ltd.), "WPI-069", "WPI-113", "WPI-116", "WPI-041", "WPI-044", "WPI-054", "WPI-055", "WPAG-281", "WPAG-567", and "WPAG-596" (each manufactured by Wako Pure Chemical Industries, Ltd.).

The content of the optical acid generator is 10% or less, preferably from 0.01 to 10%, more preferably from 0.05 to 5%, in particular preferably from 0.1 to 3% by weight of the whole of the curable resin composition.

<Compound Containing any One of Alkoxy Group and Epoxy Group>

About the active-energy-ray-curable resin composition, the optical acid generator may be used together with a compound containing any one of an alkoxy group and an epoxy group in the active-energy-ray-curable resin composition.

(Compound and Polymer Each Having Epoxy Group)

In the case of using a compound having in the molecule thereof one or more epoxy groups, or a polymer having in the molecule thereof two or more epoxy groups (epoxy resin), a compound having in the molecule thereof two or more functional groups reactive with any epoxy group may be used together. Examples of the functional group(s) reactive with any epoxy group include carboxyl, phenolic hydroxyl, mercapto, and primary or secondary aromatic amino groups. The compound in particular preferably has in a single molecule thereof two or more of these functional groups, considering the three-dimensional curability thereof.

The polymer having in the molecule thereof one or more epoxy groups is, for example, an epoxy resin. Examples thereof include bisphenol A type epoxy resin derived from bisphenol A and epichlorohydrin, bisphenol F type epoxy resin derived from bisphenol F and epichlorohydrin, bisphenol S type epoxy resin, phenol novolak type epoxy resin, cresol novolak type epoxy resin, bisphenol A novolak type epoxy resin, bisphenol F novolak type epoxy resin, alicyclic epoxy resin, diphenyl ether type epoxy resin, hydroquinone type epoxy resin, naphthalene type epoxy resin, biphenyl type epoxy resin, fluorene type epoxy resin, polyfunctional epoxy resins such as trifunctional epoxy resin and tetrafunctional epoxy resin, glycidylester type epoxy resin, glycidylamine type epoxy resin, hydantoin type epoxy resin, isocyanurate type epoxy resin, and aliphatic linear epoxy resin. These epoxy resins may be halogenated, and may be hydrogenated. Examples of a commercially available product of the epoxy resin include JER COATS 828, 1001, 801N, 806, 807, 152, 604, 630 and 871, YX8000, YX8034, and YX4000 manufactured by Japan Epoxy Resins Co., Ltd.; EPICLON 830, EXA 835LV, HP 4032D, HP 820 manufactured by DIC Corp.; EP 4100 series, EP 4000 series, and EPU series manufactured by ADEKA Corp.; CELLOXIDE series (2021, 2021P, 2083, 2085, and 3000), EPOLEAD series, and EHPE series manufactured by Daicel Corp.; YD series, YDF series, YDCN series, YDB series, and phenoxy resins (YP series and others: polyhydroxypolyethers each synthesized from a bisphenol and epichlorohydrin and having at both ends thereof epoxy groups, respectively) manufactured by Nippon Steel Chemistry Co., Ltd.; DENACOL series manufactured by Nagase ChemteX Corp.; and EPO LIGHT series and others, manufactured by Kyoeisha Chemical Co., Ltd. However, the commercially available epoxy resin product is not limited to these examples. These epoxy resins may be used in combination of two or more thereof.

(Compound and Polymer Each Having Alkoxy Group)

The compound having in the molecule thereof an alkoxy group is not particularly limited as far as the compound is a compound having in the molecule thereof one or more alkoxy groups. The compound may be any known compound. Typical examples of the compound include a melamine compound, an amino resin, and a silane coupling agent.

The blend amount of the compound containing any one of an alkoxy group and an epoxy group is usually 30% or less by weight of the whole of the curable resin composition. If the content of the compound in the composition is too large, the curable resin composition is lowered in adhesion, so that the impact resistance thereof may be deteriorated in a dropping test. The content by proportion of the compound in the composition is more preferably 20% or less by weight. In the meantime, the composition contains the compound in a proportion that is preferably 2% or more, more preferably 5% or more by weight from the viewpoint of the water resistance of the composition.

<Silane Coupling Agent>

When the curable resin composition used in the present invention is active energy ray curable, the silane coupling agent is preferably an active energy ray curable compound. However, even when the silane coupling agent is not active energy ray curable, this agent can give substantially the same water resistance to the composition.

Specific usable examples of the silane coupling agent include the organic silicon compounds given as the abovementioned examples.

The blend amount of the silane coupling agent is preferably from 0.01 to 20%, preferably from 0.05 to 15%, even more preferably from 0.1 to 10% by weight of the whole of the curable resin composition. If the blend amount is more than 20% by weight, the curable resin composition is deteriorated in storage stability. If the blend amount is less than 0.1% by weight, the composition does not sufficiently exhibit an adhesion water-resistance effect.

<Compound Having Vinyl Ether Group>

The curable resin composition used in the present invention may contain a compound having a vinyl ether group. This case is favorable since a polarizer and the resultant adhesive layer are improved in adhesion water-resistance therebetween. Reasons why this advantageous effect is gained are unclear; however, it is presumed that one of the reasons is as follows: the vinyl ether group, which the compound has, interacts with the polarizer to heighten the adhering strength between the polarizer and the adhesive layer. In order to heighten the polarizer and the adhesive layer further in adhesion water-resistance therebetween, the compound is preferably a radical polymerizable compound having a vinyl ether group. The content of the compound is preferably from 0.1 to 19% by weight of the whole of the curable resin composition.

<Keto-Enol Tautomerism Generable Compound>

A compound in which keto-enol tautomerism is generable may be incorporated into the curable resin composition used in the present invention. It is preferred to use, for example, an embodiment in which this keto-enol tautomerism generable compound is contained in the curable resin composition that contains a crosslinking agent or that is usable in the state of blending a crosslinking agent into the composition. This embodiment allows to restrain the curable resin composition after the blending of the organometallic compound into the composition from being excessively raised in viscosity or gelatinized, and from undergoing the production of a microgelatinized product to realize an effect of prolonging the pot life of this composition.

The keto-enol tautomerism generable compound may be a β-dicarbonyl compound that may be of various types. Specific examples thereof include acetylacetone, 2,4-hexanedione, 3,5-heptanedione, 2-methylhexane-3,5-dione, 6-methylheptane-2,4-dione, 2,6-dimethylheptane-3,5-dione, and other β-diketones; methyl acetoacetate, ethyl acetoacetate, isopropyl acetoacetate, tert-butyl acetoacetate, and other acetoacetates; ethyl propionylacetate, ethyl propionylacetate, isopropyl propionylacetate, tert-butyl propionylacetate, and other propionylacetates; ethyl isobutyrylacetate, ethyl isobutyrylacetate, isopropyl isobutyrylacetate, tert-butyl isobutyrylacetate, and other isobutyrylacetates; and methyl malonate, ethyl malonate, and other malonates. Out of these examples, acetylacetone and acetoacetates are preferred compounds. These keto-enol tautomerism generable compounds may be used singly or in combination of two or more thereof.

The use amount of the keto-enol tautomerism generable compound(s) may be, for example, from 0.05 to 10 parts, preferably from 0.2 to 3 parts (for example, from 0.3 to 2 parts) by weight per part by weight of the organometallic compound. If the use amount of the compound is less than 0.05 part by weight per part by weight of the organometallic compound, the use effects thereof may not be sufficiently exhibited with ease. In the meantime, if the use amount of the compound is more than 10 parts by weight per part by weight of the organometallic compound, the compound interacts excessively with the organometallic compound so that a target water resistance may not be easily expressed.

<Additives Other than Above-Mentioned Components>

Various additives may be blended, as other optional components, into the curable resin composition used in the present invention as far as the object and advantageous effects of the invention are not damaged. Examples of the additives include epoxy resin, polyamide, polyamideimide, polyurethane, polybutadiene, polychloroprene, polyether, polyester, styrene-butadiene block copolymer, petroleum resin, xylene resin, ketone resin, cellulose resin, fluorine-contained oligomer, silicone-based oligomer, polysulfide-based oligomer, and other polymers or oligomers; phenothiazine, 2,6-di-t-butyl-4-methylphenol, and other polymerization inhibitors; polymerization initiation aids; leveling agents; wettability improvers; surfactants; plasticizers; ultraviolet absorbers; inorganic fillers; pigments; and dyes.

The amount of the additives is usually from 0 to 10%, preferably from 0 to 5%, most preferably from 0 to 3% by weight of the whole of the curable resin composition.

<Viscosity of Curable Resin Composition>

The viscosity of the curable resin composition used in the present invention is preferably 100 cp or less at 25° C. from the viewpoint of the applicability thereof. In the meantime, if the curable resin composition in the invention is more than 100 cp at 25° C., the temperature of the curable resin composition may be controlled when the composition is applied, so as to adjust the viscosity thereof to 100 cp or less. The thus obtained composition is usable. The viscosity ranges more preferably from 1 to 80 cp, most preferably from 10 to 50 cp. The viscosity is measurable, using an E-type viscometer TVE22LT manufactured by Toki Sangyo Co., Ltd.

In the curable resin composition used in the present invention, it is preferred to use, as the curable component (s), a material low in skin irritation from the viewpoint of safety. The skin irritation can be judged, using an index of P.I.I. The P.I.I is widely used as an index showing the degree of skin disorder, and is measured by a Draize method. The measured value thereof is represented in a range from 0 to 8. As this value is smaller, the irritation is judged to be lower. However, the measured value includes a large accidental error; thus, it is advisable to understand this index as a reference value. The P.I.I is preferably 4 or less, more preferably 3 or less, most preferably 2 or less.

<Polarizing Film>

The polarizing film of the present invention is a polarizing film including a polarizer, and an adhesive layer yielded by curing the curable resin composition and positioned on/over at least one surface of the polarizer, in particular preferably, a polarizing film in which the adhesive layer is an adhesive layer, and a transparent protective film is laid on/over at least one surface of the polarizer to interpose the adhesive layer between the surface and the transparent protective film. The following will describe the polarizing film, giving, as an examples, a polarizing film in which a transparent protective film is laid on at least one surface of a polarizer to interpose an adhesive layer therebetween.

<Adhesive Layer>

The adhesive layer made from the curable resin composition, in particular, the adhesive layer preferably has a thickness of 0.01 to 3.0 µm. If the thickness of the adhesive layer is too small, the adhesive layer is short in cohesive strength to be unfavorably lowered in peel strength. If the thickness of the adhesive layer is too large, a peel is easily caused in the polarizing film when a stress is applied to a cross section of this film, so that a peel defect is unfavorably generated therein by impact. The thickness of the adhesive layer is more preferably from 0.1 to 2.5 µm, most preferably from 0.5 to 1.5 µm.

The polarizing film according to the present invention can be produced by the following producing method:

a polarizing film producing method including a polarizer, and a transparent protective film laminated on/over at least one surface of the polarizer to interpose an adhesive layer between the surface and the transparent protective film; this method including: an adhesion improvement-treating step of causing a compound represented by the following general formula (1):

[Formula 12]

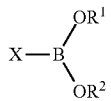

(1)

wherein X is a functional group containing a reactive group, and $R^1$ and $R^2$ each independently represent a hydrogen atom, or an aliphatic hydrocarbon group, aryl group or heterocyclic group that may have a substituent, or an organometallic compound having a structural formula having an M-O bond wherein M is silicon, titanium, aluminum or zirconium, and O represents an oxygen atom to adhere to the adhesion surface of the polarizer; an applying step of applying a curable resin composition to the adhesion surface of at least one of the polarizer and the transparent protective film; a bonding step of bonding the polarizer and the transparent protective film to each other; and an adhering step of radiating an active energy ray to the resultant workpiece from a polarizer surface side or a transparent protective film surface side of the workpiece to yield an adhesive layer, and causing the polarizer and the transparent protective film to adhere to each other through the yielded adhesive layer. About the polarizing film producing method, each of the steps will be described hereinafter.

<Adhesion Improving-Treating Step>

For the adhesion improving treating step of forming an adhesion-improving layer onto an adhesion surface of a polarizer, for example, the following step is given: a method of producing an adhesion-improving composition (A) including a compound represented by the general formula (1) or an organometallic compound having a structural formula having an M-O bond wherein M is silicon, titanium, aluminum or zirconium, and O represents an oxygen atom, and then forming this composition into a film onto the adhesion surface of the polarizer by, for example, applying. A solvent and additives that are other than the compound represented by the general formula (1) or the organometallic compound, and that may be included in the adhesion-improving composition (A) are as described above.

When the adhesion-improving composition (A) includes a solvent, it is allowable that after the applying or applying of the composition (A), the resultant is optionally subjected to a drying step or a curing treatment (for example, thermal treatment).

About the method for using the adhesion-improving composition (A) to forming the adhesion-improving layer on the polarizer, the following is appropriately usable: a method of immersing the polarizer directly onto a treatment bath for the composition (A), or a known applying method. Examples of the applying method include roll coating, gravure coating, reverse coating, roll brushing, spray coating, air knife coating, and curtain coating methods. However, the method is not limited to these methods.

If the thickness of the adhesion-improving layer, which the polarizer has, is too large in the present invention, the adhesion-improving layer may be lowered in cohesive strength so that an adhesion-improving effect thereof may be lowered. Thus, the thickness of the adhesion-improving layer is 300 nm or less, preferably 200 nm or less. From the viewpoint of the producibility of polarizing films, the thickness is more preferably 100 nm or less. In the meantime, the lower limit of the thickness for causing the adhesion-improving layer to exhibit an advantageous effect sufficiently is at least the thickness of a monomolecular membrane of the compound represented by the general formula (1), and is usually 0.1 nm or more, preferably 1 nm or more, more preferably 2 nm or more.

<Applying Step>

The method for applying the curable resin composition is appropriately selected in accordance with the viscosity of the curable resin composition, or a target thickness of the resultant layer. Examples thereof include a reverse coater, a (direct, reverse or offset) gravure coater, a bar reverse coater, a roll coater, a die coater, a bar coater, and a rod coater. The viscosity of the curable resin composition used in the present invention is preferably from 3 to 100 mPa·s, more preferably from 5 to 50 mPa·s, most preferably from 10 to 30 mPa·s. If the viscosity of the curable resin composition is high, the surface of the applied composition is poor in smoothness so that a poor external appearance may be unfavorably generated. The curable resin composition used in the present invention can be applied in the state of heating or cooling the composition to be adjusted into a preferred viscosity range.

About the polarizer, which is a constituent matter of the polarizing film according to the present invention, it is preferred from the viewpoint of an improvement of the polarizer in adhesion to the adhesive layer that the water content by percentage in the polarizer before the applying step is as low as possible. When the adhesive layer is made of, in particular, an acrylic adhesive, the water content by percentage in the polarizer before the composition (A) is applied thereto is preferably 15% or less, more preferably 13% or less, in particular preferably 10% or less by weight from the viewpoint of a further improvement in the adhesion.

The polarizer and the transparent protective film may be subjected to a surface-modifying treatment before the adhesion-improving layer is formed. In particular, about the polarizer, it is preferred to subject the outer surface of the polarizer to a surface-modifying treatment before the formation or bonding of the adhesion-improving layer. Examples of the surface-modifying treatment include corona treatment, plasma treatment, and Itro treatment. Particularly preferred is corona treatment. By conducting the corona treatment, reactive functional groups, such as carbonyl group or amino group, are generated on the surface of the polarizer to improve close adhesion of the polarizer to the adhesive layer. Additionally, the treatment allows to remove foreign substances on the surface, or relieve irregularities in the surface by ashing effect, so that a polarizing film excellent in external appearance properties can be produced.

<Bonding Step>

Through the curable resin composition applied as described above, the polarizer and the transparent protective film are bonded to each other. The bonding between the polarizer and the transparent protective film may be attained, using, for example, a roll laminator.

<Adhering Step>

In the adhering step, an active energy ray is radiated to the workpiece from the polarizer surface side thereof or the transparent protective film surface side thereof to cure the curable resin composition. Through the thus obtained adhesive layer, the polarizer and the transparent protective film are caused to adhere to each other.

The adhesive layer made from the curable resin composition, in particular, the adhesive layer preferably has a thickness of 0.01 to 3.0 µm. If the thickness of the adhesive layer is too small, the adhesive layer is insufficient in cohesive strength to be unfavorably lowered in peel strength. If the thickness of the adhesive layer is too large, a peel is easily caused in the polarizing film when a stress is applied to a cross section of this film, so that a peel defect is unfavorably generated therein by impact. The thickness of the adhesive layer is more preferably from 0.1 to 2.5 µm, most preferably from 0.5 to 1.5 µm.

The curable resin composition used in the present invention is preferably used as an active-energy-ray-curable resin composition. The active-energy-ray-curable resin composition is usable in an electron beam curable, ultraviolet curable or visible ray curable form. The form of the curable resin composition is preferably a visible-ray-curable resin composition from the viewpoint of the producibility of polarizing films.

<<Active Energy Ray Curability>

About the active-energy-ray-curable resin composition, a polarizer and a transparent protective film are bonded onto each other, and subsequently the resultant workpiece is irradiated with an active energy ray (such as an electron beam, an ultraviolet ray or a visible ray) to cure the active-energy-ray-curable resin composition to form an adhesive layer. A direction along which the active energy ray (which is, for example, an electron beam, an ultraviolet ray or a visible ray) is radiated may be any appropriate radiating direction. Preferably, the active energy ray is radiated from the transparent protective film side of the workpiece. If the active energy ray is radiated from the polarizer side thereof, the polarizer may be unfavorably deteriorated by the active energy ray (which is, for example, an electron beam, an ultraviolet ray or a visible ray).

<<Electron Beam Curability>>

About the electron beam curability, conditions for radiating an electron beam may be arbitrarily-selected appropriate conditions as far as the conditions are conditions under which the active-energy-ray-curable resin composition is curable. About the electron beam radiation, for example, the accelerating voltage is preferably from 5 to 300 kV, more preferably from 10 to 250 kV. If the accelerating voltage is less than 5 kV, the electron beam may not reach the adhesive so that the adhesive may not be unfavorably cured sufficiently. If the accelerating voltage is more than 300 kV, the penetrating power of the beam into a sample is too strong, so that the beam may unfavorably damage its transparent protective film or polarizer. The radiation ray quantity thereof is from 5 to 100 kGy, more preferably from 10 to 75 kGy. If the radiation ray quantity is less than 5 kGy, the adhesive is insufficiently cured. If the quantity is more than 100 kGy, the transparent protective film or the polarizer is damaged, so that the polarizing film is lowered in mechanical strength or yellowed not to gain predetermined optical properties.

The electron beam radiation is usually performed in an inert gas. If necessary, the radiation may be performed in the atmospheric air or under conditions that a small amount of oxygen is introduced into an inert gas. An appropriate introduction of oxygen dares to cause oxygen blocking in a surface of the transparent protective film onto which the electron beam is to be initially radiated, so that the beam can be prevented from damaging the transparent protective film to radiate the electron beam effectively only to the adhesive although this matter depends on the material of the transparent protective film.

<<Ultraviolet Curability and Visible Ray Curability>>

In a method for producing the polarizing film according to the present invention, it is preferred to use, as active energy rays, rays including visible rays having wavelengths ranging from 380 to 450 nm, particularly, active energy rays in which the radiation quantity of visible rays having wavelengths ranging from 380 to 450 nm is the largest. When a transparent protective film to which ultraviolet ray absorbing power is given (ultraviolet non-transmissible type transparent protective film) is used about ultraviolet curability or visible ray curability, the transparent protective film absorbs light rays having wavelengths shorter than about 380 nm; thus, the light rays having wavelengths shorter than 380 nm do not reach the active-energy-ray-curable resin composition not to contribute to a polymerization reaction of the composition. Furthermore, the light rays having wavelengths shorter than 380 nm, which are absorbed by the transparent protective film, are converted to heat, so that the transparent protective film itself generates heat. The heat causes defects of the polarizing film, such as a curling or wrinkles of the film. Thus, in the case of adopting, in the present invention, ultraviolet curability or visible ray curability, it is preferred to use, as an active energy ray generating device, a device which does not emit light rays shorter than 380 nm. More specifically, a device in which the ratio of the integrated illuminance of light rays having a wavelength range from 380 to 440 mm to that of light rays having a wavelength range from 250 to 370 nm is preferably from 100/0 to 100/50, more preferably from 100/0 to 100/40. For the active energy ray related to the present invention, preferred is a gallium sealed metal halide lamp, or an LED light source emitting light rays having a wavelength range from 380 to 440 nm. Alternatively, a light source including ultraviolet rays and visible rays is usable, examples of which include a low pressure mercury lamp, a middle pressure mercury lamp, a high pressure mercury lamp, a super high pressure mercury lamp, an incandescent lamp, a xenon lamp, a halogen lamp, a carbon arc light, a metal halide lamp, a fluorescent lamp, a tungsten lamp, a gallium lamp, an excimer laser, and sunlight. It is allowable to use light rays about which a bandpass filter is used to block ultraviolet rays having wavelengths shorter than 380 nm. In order to heighten the adhesive performance of the adhesive layer between the polarizer and the transparent protective film, and simultaneously prevent the polarizing film from being curled, it is preferred to use an active energy ray obtained by using a gallium sealed metal halide lamp and further passing light therefrom through a bandpass filter which can block light rays having wavelengths shorter than 380 nm, or use an active energy ray having a wavelength of 405 nm, which is obtained by using an LED light source.

About the ultraviolet curability or visible ray curability, it is preferred to heat the active-energy-ray-curable resin composition before the radiation of ultraviolet rays or visible rays (heating before radiation) to the composition. In this case, the composition is heated preferably to 40° C. or higher, more preferably to 50° C. or higher. It is also preferred to heat the active-energy-ray-curable resin composition after the radiation of ultraviolet rays or visible rays (heating after radiation) thereto. In this case, the composition is heated preferably to 40° C. or higher, more preferably to 50° C. or higher.

The active-energy-ray-curable resin composition used in the present invention is favorably usable, particularly, when an adhesive layer is formed for causing a polarizer to adhere to a transparent protective film about which the transmittance of light rays having a wavelength of 365 nm is less than 5%. At this time, the active-energy-ray-curable resin composition according to the invention may include a photopolymerization initiator of the general formula (3); in this case, by radiating ultraviolet rays to the composition across the transparent protective film having UV absorbing power, the composition can be cured to form the adhesive layer. Thus, also in a polarizing film in which transparent protective films having UV absorbing power are laminated, respectively, onto both surfaces of a polarizer, its adhesive layers can be cured. Naturally, however, also in a polarizing film in which a transparent protective film having no UV absorbing power is laminated, its adhesive layers can be cured. The wording "transparent protective film having UV absorbing power" means a transparent protective film about which the transmittance of a light ray having a wavelength of 380 nm is less than 10%.

The method for giving UV absorbing power to a transparent protective film may be a method of incorporating an ultraviolet absorbent into the transparent protective film, or a method of laminating a surface treatment layer containing an ultraviolet absorbent onto a surface of the transparent protective film.

Specific examples of the ultraviolet absorbent include oxybenzophenone-based compounds, benzotriazole-based compounds, salicylate-based compounds, benzophenone-based compounds, cyanoacrylate-based compounds, nickel complex salt type compounds, and triazine-based compounds, which are known in the prior art.

After the polarizer and the transparent protective film are bonded onto each other, the active-energy-ray-curable resin composition is irradiated with an active energy ray (such as an electron beam, a ultraviolet ray or a visible ray) to be cured to form an adhesive layer. A direction along which the active energy ray (which is, for example, an electron beam, an ultraviolet ray or a visible ray) is radiated may be any appropriate radiating direction. Preferably, the active energy ray is radiated from the transparent protective film side of the resultant workpiece. If the active energy ray is radiated from the polarizer side thereof, the polarizer may be unfavorably deteriorated by the active energy ray (which is, for example, an electron beam, an ultraviolet ray or a visible ray).

When the polarizing film according to the present invention is produced in a continuous line, the line speed, which depends on the curing period of the curable resin composition, is preferably from 1 to 500 m/min., more preferably from 5 to 300 m/min., even more preferably from 10 to 100 m/min. If the line speed is too small, the producing system is small in producing performance, or the transparent protective film is excessively damaged, so that no polarizing film that can endure an endurance test or the like can be produced. If the line speed is too large, the adhesive resin composition is insufficiently cured so that the composition may not gain a target adhesion.

In the polarizing film of the present invention, preferably, a polarizer and a transparent protective film are caused to adhere onto each other to interpose, therebetween, a second adhesive layer constituted by a cured product layer of the above-mentioned active-energy-ray-curable resin composition. Between the transparent protective film and the adhesive layer, a second adhesion-improving layer may be disposed. The second adhesion-improving layer can be formed, using a resin that may be of various types. This resin has, for example, a polyester, polyether, polycarbonate, polyurethane, silicone type, polyamide, polyimide or polyvinyl alcohol skeleton. These polymeric resins may be used singly or in any combination of two or more thereof. In the formation of the second adhesion-improving layer, a different additive may be added thereto. Specifically, for example, the following may be further used: a tackifier, a ultraviolet absorbent, an antioxidant, a heat-resistant stabilizer, and other stabilizers.

The second adhesion-improving layer is usually laid on the transparent protective film in advance, and the second adhesion-improving layer side of the transparent protective film and the polarizer are caused to adhere onto each other through the adhesive layer. The formation of the second adhesion-improving layer is attained by applying a material for forming the second adhesion-improving layer onto the transparent protective film, and then drying the resultant according to a known technique. The material for forming the second adhesion-improving layer is usually prepared in the form of a solution in which the concentration of the material is diluted into an appropriate concentration, considering the thickness of the material-dried layer, the smoothness of the applying, and others. The thickness of the dried second adhesion-improving layer is preferably from 0.01 to 5 μm, more preferably from 0.02 to 2 μm, even more preferably from 0.05 to 1 μm. Plural second adhesion-improving layers may be laid. In this case also, however, the total thickness of the second adhesion-improving layers is set preferably into any one of these ranges.

<Polarizer>

The polarizer is not particularly limited, and may be of various types. The polarizer is, for example, a polarizer yielded by causing a dichroic material such as iodine or dichroic dye to be adsorbed into a hydrophilic polymeric film, such as a polyvinyl alcohol-based film, a partially-formal-converted polyvinyl alcohol-based film or an ethylene/vinyl acetate copolymer-based partially-saponified film, and then stretching the resultant uniaxially; or a polyene aligned film made of, for example, a polyvinyl alcohol dehydrated product or a polyvinyl chloride de-hydrochloride-treated product. Out of such polarizers, preferred is a polarizer composed of a polyvinyl alcohol-based film and a dichroic substance such as iodine. The thickness of such a polarizer is preferably from 2 to 30 μm, more preferably for 4 to 20 μm, most preferably from 5 to 15 μm. If the thickness of the polarizer is small, the polarizer is unfavorably lowered in optical endurance. If the thickness of the polarizer is large, the polarizer becomes large in dimension change at a high temperature and high humidity, so that inconveniences such as display unevenness are unfavorably generated.

The polarizer in which a polyvinyl alcohol-based film that has been dyed with iodine has uniaxially stretched can be produced, for example, by immersing a polyvinyl alcohol into an aqueous solution of iodine to be dyed, and then stretching the resultant film into a length 3 to 7 times the original length of this film. As required, the stretched film may be immersed into an aqueous solution of, for example, boric acid or potassium iodide. Furthermore, before the dyeing, the polyvinyl alcohol-based film may be immersed into water as required to be cleaned with water. The cleaning of the polyvinyl alcohol-based film with water allows to clean stains and a blocking-preventing agent on surfaces of the polyvinyl alcohol-based film, and further produce an advantageous effect of swelling the polyvinyl alcohol-based film to prevent unevenness of the dyeing, and any other unevenness. The stretching may be performed after the dyeing with iodine or while the dyeing is performed. Alternatively, after the stretching, the dyeing with iodine may be performed. The stretching may be performed in an aqueous solution of, for example, boric acid or potassium iodide, or in a water bath.

When a thin polarizer having a thickness of 10 μm or less is used as the polarizer, the active-energy-ray-curable resin composition used in the present invention can remarkably produce the advantageous effect thereof (that the resultant layer satisfies optical endurance in a severe environment at a high temperature and high humidity). The polarizer, the thickness of which is 10 μm or less, is more largely affected by water than any polarizer having a thickness more than 10 μm. Consequently, the former is insufficient in optical endurance in an environment at a high temperature and high humidity to be easily raised in transmittance or lowered in polarization degree. In other words, in the case of laminating the polarizer, the thickness of which is 10 μm or less, onto a transparent protective film through an adhesive layer having a bulk water absorption of 10% or less by weight in the invention, the shift of water into the polarizer is restrained in a severely high temperature and high humidity environment. Consequently, the polarizing film can be remarkably restrained from undergoing deteriorations in optical endurances, such as a rise in transmittance and a lowering in polarization degree. The thickness of the polarizer is preferably from 1 to 7 μm from the viewpoint of making the polarizing film thinner. Such a thin polarizer is small in thickness unevenness, excellent in perceptibility, and small in dimension change. Furthermore, favorably, this thin polarizer also makes the polarizing film small in thickness.

Typical examples of the thin polarizer include thin polarizing membranes described in JP-A-51-069644, JP-A-2000-338329, WO 2010/100917 pamphlet, and specifications of PCT/JP2010/001460 and Japanese Patent Applications No. 2010-269002 and No. 2010-263692. These thin polarizing membranes can each be yielded by a producing method including the step of stretching a polyvinyl alcohol-based resin (hereinafter referred to also as a PVA-based resin) and a resin substrate for stretching in a laminate state, and the step of dyeing the laminate. This producing method allows to draw the laminate, even when the PVA-based resin layer is thin, without causing inconveniences, such as breaking by the stretching, on the basis of the supporting of the PVA-based resin layer on the resin substrate for stretching.

The thin polarizing membranes are preferably polarizing membranes each yielded by the following producing method, out of producing methods including the step of stretching a PVA-based resin and a resin substrate in a laminate state, and the step of dyeing the laminate, since the laminate can be stretched into a high draw ratio to improve the resultant in polarizing performance: a producing method including the step of stretching the laminate in an aqueous solution of boric acid, as is described in a pamphlet of WO 2010/100917, or a specification of PCT/JP 2010/001460 or Japanese Patent Application No. 2010-269002 or 2010-263692. The thin polarizing membranes are in particular preferably thin polarizing membranes each yielded by a producing method including the step of stretching the laminate supplementally in the air before the stretching in the aqueous solution of boric acid, as is described in a specification of Japanese Patent Application No. 2010-269002 or 2010-263692.

The polarizer usually has reactive functional group, such as hydroxyl, carbonyl, and amino groups. Thus, the polarizer that has been subjected to the adhesion improving-treatment and that has, in at least one surface thereof, the above-mentioned organometallic compound is preferred since close adhesion between the polarizer and the adhesive layer is improved so that adhesion therebetween is particularly improved.

<Transparent Protective Film>

The transparent protective film is preferably a film excellent in transparency, mechanical strength, thermal stability, water blocking performance, isotropy and others. Examples of a material therefor include polyester-based polymers, such as polyethylene terephthalate and polyethylene naphthalate, cellulose-based polymers such as diacetylcellulose and triacetylcellulose, acrylic polymers such as polymethyl methacrylate, styrene-based polymers such as polystyrene and acrylonitrile/styrene copolymer (AS resin), and polycarbonate-based polymers. Other examples of the polymer which the transparent protective film is made of include polyethylene, polypropylene, polyolefins each having a cyclic or norbornene structure, polyolefin-based polymers such as ethylene/propylene copolymer, vinyl chloride polymers, amide-based polymers such as nylon and aromatic polyamide, imide polymers, sulfone-based polymers, polyethersulfone-based polymers, polyetheretherketone-based polymers, polyphenylene sulfide-based polymers, vinyl alcohol-based polymers, vinylidene chloride-based polymers, vinyl butyral-based polymers, arylate-based polymers, polyoxymethylene-based polymers, and epoxy-based polymers; and any blend composed of two or more of these polymers. The transparent protective film may contain one or more appropriate additives selected at will. Examples of the additive(s) include an ultraviolet absorbent, an antioxidant, a lubricant, a plasticizer, a release agent, a coloring preventive, a flame retardant, a nucleating agent, an antistatic agent, a pigment and a colorant. The content of one or more of the above-mentioned thermoplastic resins in the transparent protective film is preferably from 50 to 100%, more preferably from 50 to 99%, even more preferably from 60 to 98%, in particular preferably from 70 to 97% by weight. If the content of the thermoplastic resin(s) in the transparent protective film is 50% or less by weight, it is feared that the transparent protective film cannot sufficiently express high transparency and other properties which the thermoplastic resin(s) originally has/have.

The transparent protective film may be a polymer film described in JP-A-2001-343529 (WO 01/37007), for example, a resin composition including a thermoplastic resin (A) having at a side chain thereof a substituted imide group and/or an unsubstituted imide group and a thermoplastic resin having at a side chain thereof a substituted phenyl and/or an unsubstituted phenyl, and a nitrile group. A specific example thereof is a film of a resin composition including an alternating copolymer made from isobutylene and N-methylmaleimide, and acrylonitrile/styrene copolymer. The film may be a film made of, for example, a blend extruded product of the resin composition. Such a film is small in retardation, and small in photoelastic coefficient; thus, this film can solve inconveniences, such as an unevenness of the polarizing film that is based on strains in the film. Moreover, the film is small in water-vapor permeability to be excellent in humidity endurance.

In the polarizing film, the transparent protective film preferably has a water-vapor permeability of 150 g/m$^2$/24-hours or less. This structure makes it difficult that water in the air enters the inside of the polarizing film, so that the water content by percentage in the polarizing film itself can be restrained from being changed. As a result, the polarizing film can be restrained from being curled or changed in dimension by a storage environment of the film.

The transparent protective film laid over one surface or each of both surfaces of the polarizer is preferably a film excellent in transparency, mechanical strength, thermal stability, water blocking performance, isotropy and others; and is more preferably a material the water-vapor permeability of which is particularly 150 g/m$^2$/24-hours or less, in particular preferably 120 g/m$^2$/24-hours or less, more preferably from 5 to 70 g/m$^2$/24-hours. The water-vapor permeability is gained by a method described in the item EXAMPLES.

Examples of a material for forming the transparent protective film satisfying the above-mentioned low water-vapor permeability include polyester resins, such as polyethylene terephthalate and polyethylene naphthalate; polycarbonate resins; arylate-based resins; amide-based resins such as nylon and aromatic polyamide; polyolefin-based polymers such as polyethylene, polypropylene and ethylene/propylene copolymer, cyclic olefin-based resins having a cyclic or norbornene structure, and (meth)acrylic resins; and mixtures each made of two or more of these resins. Out of these resins, preferred are polycarbonate resins, cyclic polyolefin-based resins and (meth)acrylic resins, and particularly preferred are cyclic polyolefin-based resins and (meth)acrylic resins.

The thickness of the transparent protective film may be appropriately decided, and is generally from about 5 to 100 µm, in particular preferably from 10 to 60 µm, more preferably from 20 to 40 µm from the viewpoint of the strength, the handleability and other workabilities of the film, thin-layer properties of the film, and other factors.

As required, the transparent protective film is subjected to a surface-modifying treatment, such as corona treatment, plasma treatment, or saponifying treatment, to have reactive functional group, such as hydroxyl, carbonyl and amino groups. Thus, the transparent protective film having, on a surface thereof, at least reactive functional groups is improved in close adhesion to the adhesive layer, so that the polarizing film is improved in adhesion.

The method for bonding the polarizer and the protective film to each other may be a method using a roll laminator. The method for laminating protective films, respectively, onto both surfaces of the polarizer is selected from a method of bonding the polarizer to one of the protective films, and then bonding the other protective film to the resultant, and a method of bonding the two protective films simultaneously to the polarizer. Air bubbles involved between the polarizer and the protective films, which are generated at the time of the bonding, can be remarkably decreased by adopting the former method, that is, the method of bonding the polarizer to one of the protective films, and then bonding the other protective film to the resultant. Thus, the former method is favorable.

The method for curing the curable resin composition may be appropriately selected in accordance with the curing form of the curable resin composition. When the curable resin composition is thermally curable, the composition can be cured by heating treatment. The method for the heating treatment may be a method known in the prior art, such as a hot-wind oven, or an IR oven. When the curable resin composition is active energy ray curable, the composition can be cured by radiating an active energy ray, such as an electron beam, an ultraviolet ray or a visible ray, thereto. When the curable resin composition has both thermal curability and active energy ray curability, a combination of two or more of these methods is adoptable. The curable resin composition according to the present invention is preferably active energy ray curable. The use of the active-energy-ray-curable resin composition favorably makes the polarizing-film-producing method excellent in producing performance, and can further restrain their polarizer from being lowered in optical properties by heat. Furthermore, it is preferred that the curable resin composition of the present invention does not substantially contain any volatile solvent. When the composition does not substantially contain any volatile solvent, no heating treatment is required so that the producing performance is favorably made excellent, and further the polarizer can be favorably restrained from being lowered in optical properties by heat.

<Optical Film>

When put into practical use, the polarizing film of the present invention is usable in the form of an optical film in which the polarizing film is laminated onto another optical film. The optical film is not particularly limited. Examples of the optical film include a reflector, a transreflector, retardation plates (for example, a wavelength plates such as a half wavelength plate and a quarter wavelength plate), and a viewing angle compensation film, and other layers usable to form a liquid crystal display device or the like. These layers may be used singly or in the form of two or more layers thereof. The polarizing film of the present invention is in particular preferably a reflection type polarizing film in which a reflector or a transreflector is further laminated on any polarizing film of the invention, an elliptically or circularly polarizing film in which a retardation plate is further laminated on the polarizing film, a wide viewing angle polarizing film in which a viewing angle compensation film is further laminated on the polarizing film, or a polarizing film in which a brightness enhancement film is further laminated on the polarizing film.

An optical film in which optical films as described above are laminated onto the polarizing film may be formed in such a manner that the layers are successively and individually laminated onto each other in a process for producing, for example, a liquid crystal cell display device. An optical film prepared by laminating the layers beforehand onto each other is excellent in quality stability, fabricating workability and others to have an advantage of improving a process for producing, for example, a liquid crystal display device. For the laminating, a pressure-sensitive adhesive layer or any other appropriate adhesive means may be used. In the bonding of the polarizing film or the other optical film(s), its or their optical axis may be adjusted to have an appropriate location angle in accordance with, for example, a target retardation property.

In the above-defined polarizing film, or an optical film in which this polarizing film or such polarizing films are laminated onto a member, a pressure-sensitive adhesive layer may be laid for bonding this polarizing film or optical film onto a different member such as a liquid crystal cell. A pressure-sensitive adhesive agent which forms the pressure-sensitive adhesive layer is not particularly limited. This agent may be appropriately selected from the following, and then used: pressure-sensitive adhesive agents each containing, as a base polymer thereof, an acrylic polymer, silicone-based polymer, polyester, polyurethane, polyamide, polyether, fluorine-containing polymer, rubbery polymer, or some other polymer. The pressure-sensitive adhesive agent is in particular preferably an acrylic pressure-sensitive adhesive, or any other pressure-sensitive adhesive that is excellent in optical transparency, and shows adherabilities of appropriate wettability, cohesive property and adhesion to be excellent in weather resistance, heat resistance and others.

Pressure-sensitive adhesive layers may be laid, as superimposed layers different from each other in, for example, composition or species, onto a single surface or each surface of the polarizing film or the optical film. When pressure-sensitive adhesive layers are laid, respectively, onto both surfaces of the polarizing or optical film, these layers may be different from each other in, for example, composition, species or thickness on the front and rear side of the film. The thickness of (each of) the pressure-sensitive adhesive layer(s) may be appropriately decided in accordance with, for example, the use purpose and adhering strength thereof. The thickness is generally from 1 to 500 µm, preferably from 1 to 200 µm, in particular preferably from 1 to 100 µm.

A separator is temporarily bonded to a naked surface of the pressure-sensitive adhesive layer to cover the surface in order to attain the prevention of the pollution of the surface, and other purposes until this layer is put into practical use. This coverage allows to prevent a person or object from contacting the pressure-sensitive adhesive layer in an ordinarily handled state thereof. The separator may be an appropriate separator according to conventional techniques except the above-mentioned thickness conditions, for example, a plastic film, a rubber sheet, a paper, cloth or nonwoven cloth piece, a net, a foamed sheet or a metal foil piece; a laminated body of such flat pieces; or a product in which such a flat piece is optionally subjected to coating treatment with an appropriate release agent, such as a silicone type, long-chain alkyl type or fluorine-containing type agent, or molybdenum sulfide.

<Image Display Device>

The polarizing film or optical film of the present invention is preferably usable to form various devices such as a liquid crystal display device. The formation of the liquid crystal display device may be attained in accordance with the prior art. In other words, any liquid crystal display device is generally formed, for example, by: fabricating appropriately a liquid crystal cell and a polarizing film or optical film, and further other optional constituent parts such as an optional lighting system; and then integrating a driving circuit into the resultant. In the present invention, the method for the formation is not particularly limited except that the use of the polarizing film or optical film according to the invention. Thus, the method is substantially according to the prior art. The liquid crystal cell may be also of any type, such as a TN type, STN type or $\pi$ type.

An appropriate liquid crystal display device may be formed, examples thereof including a liquid crystal display device in which a polarizing film or optical film is arranged onto a single side or each of both sides of a liquid crystal cell, and a liquid crystal display device in which a backlight or reflector is used as a lighting system. In this case, any polarizing film or optical film according to the present invention can be set on the single side or each of both the sides of the liquid crystal cell. When polarizing films or optical films of the invention are set up, respectively, on both the sides, these may be the same as or different from each other. When the liquid crystal display device is formed, one or more appropriate components may be further arranged, at one or more appropriate positions of the device, in the form of one or more layers of the component(s), examples of the component(s) including a diffusion plate, an anti-glare layer, an anti-reflection film, a protective plate, a prism array, a lens array sheet, a light diffusion plate, and a backlight.

EXAMPLES

Hereinafter, working examples of the present invention will be described. However, embodiments of the invention are not limited thereto.

<Production of Each Polarizer>

A 45-μm-thickness film of a polyvinyl alcohol having an average polymerization degree of 2400 and a saponification degree of 99.9% by mole was immersed in hot water of 30° C. temperature for 60 seconds to be swollen. Next, the film was immersed in an aqueous solution of iodine and potassium iodide (ratio by weight=0.5/8), the concentration thereof being 0.3%, and the film was dyed therewith while stretched into a length 3.5 times the original length. Thereafter, the film was stretched in an aqueous solution of a boric acid that had a temperature of 65° C. to give a total stretch ratio of 6. After the stretching, the film was dried in an oven of 40° C. temperature for 3 minutes. In this way, each polyvinyl alcohol-based polarizer (thickness: 18 μm) was yielded.

<Transparent Protective Films>

Each protective film A: A biaxial kneader was used to mix 100 parts by weight of an imidated MS resin described in Production Example 1 in JP-A-2010-284840 with 0.62 parts by weight of a triazine-based ultraviolet absorbent (trade name: T-712, manufactured by Adeka Corp.) at 220° C. to produce resin pellets. The resultant resin pellets were dried at 100.5 kPa and 100° C. for 12 hours, and a uniaxial extruder was then used to extrude the pellets through a T die at a dice temperature of 270° C. to be shaped into the form of a film (thickness: 160 μm). Furthermore, this film was stretched into the transporting direction thereof in an atmosphere of 150° C. temperature (thickness: 80 μm). Next, an adhesion-improving agent containing an aqueous urethane resin was applied onto the film, and then the film was stretched into a direction orthogonal to the film-transporting direction in an atmosphere of 150° C. temperature. In this way, each transparent protective film A of 40 μm thickness was yielded.

Each protective film B: Each 60-μm-thickness triacetyl-cellulose film (FUJITACK TG60UL, manufactured by Fujifilm Corp.) was used.

Each protective film C: Each 50-μm-thickness cyclic olefin polymer film (COP) (ZB-12, manufactured by Zeon Corp.) was used.

<Active Energy Rays>

As active energy rays, visible rays (gallium sealed metal halide lamp) were used. Radiating device: Light HAMMER 10, manufactured by Fusion UV Systems, Inc. Bulb: V bulb. Peak irradiance: 1600 mW/cm$^2$. Integrated radiated-light quantity: 1000/mJ/cm$^2$ (wavelengths: 380 to 440 nm). The irradiance of the visible rays was measured, using a Sola-Check system manufactured by Solatell Ltd.

(Preparation of Curable Resin Composition)

A curable resin composition was prepared which included the following in this curable resin composition, the total proportion of which was 100% by weight: 10% by weight of hydroxyethylacrylamide (manufactured by Kojin Co., Ltd.); 30% by weight of acryloylmorpholine (manufactured by Kojin Co., Ltd.); 45% by weight of 1, 9-nonanediol diacrylate (manufactured by Kyoeisha Chemical Co., Ltd.); 10% by weight of 10% by weight of a product ARUFRON UP1190 (acrylic oligomer yielded by polymerizing (meth) acrylic monomers, this product being manufactured by Toagosei Co., Ltd.); 3% by weight of a product IRGACURE 907 (polymerization initiator, manufactured by the company BASF); and 2% by weight of a product KAYACURE DETX-S (polymerization initiator, manufactured by Nippon Kayaku Co., Ltd.

Examples 1 to 27, and Comparative Examples 1 to 2

(Preparation of Adhesion-Improving Composition (A) for Forming Each Adhesion-Improving Layer)

An adhesion-improving composition (A) used in each of Examples 1 to 27 and Comparative Examples 1 to 2 was yielded by mixing individual components with each other in accordance with a blend table described in one of Tables 1 to 4. Compounds blended into the adhesion-improving composition (A) are as follows:

3-Acrylamidephenylboric acid (compound represented by the general formula (1): (manufactured by Junsei Chemical Co., Ltd.), 3-Methacrylamidephenylboric acid (compound represented by the general formula (1): (manufactured by Junsei Chemical Co., Ltd.), 4-Methacrylamidephenylboric acid (compound represented by the general formula (1)): (manufactured by Junsei chemical Co., Ltd.), 4-Vinylphenylboric acid (compound represented by the general formula (1)): (manufactured by Junsei chemical Co., Ltd.), OLFINE EXP 4200 (leveling agent): (manufactured by Nissin Chemical Industry Co., Ltd.), ARON A-104 (binder component): acrylic resin (solid content: 40%) (manufactured by Toagosei Co., Ltd.), JC-25 (binder component): polyvinyl alcohol resin (manufactured by Japan VAM & Poval Co., Ltd.), KBM-603 (amine-modified silane coupling agent), manufactured by a company Shin-Etsu Silicone, X-12-967C (succinic-anhydride-modified silane coupling agent), manufactured by the company Shin-Etsu Silicone, KBM-602 (amine-modified silane coupling agent), manufactured by the company Shin-Etsu Silicone, KBM-5103 (acryl-modified silane coupling agent), manufactured by the company Shin-Etsu Silicone, TA-21 (titanium butoxide (the number of carbon atoms in the organic group: 4)), manufactured by Matsumoto Fine Chemical Co., Ltd., TC-100 (titanium acetylacetonate (the number of carbon atoms in the organic group: 5)), manufactured by Matsumoto Fine Chemical Co., Ltd., TC-750 (ethyl acetoacetate chelate (the number of carbon atoms in the organic group: 6)), manufactured by Matsumoto Fine chemical Co., Ltd., M-5300 (carboxyl-group-containing monomer), manufactured by Toagosei Co., Ltd., and HOA-MS (carboxyl-group-containing monomer), manufactured by Kyoeisha Chemical Co., Ltd.

(Production of Polarizing Film)

The composition (A) used in each of Examples 1 to 27 and Comparative Examples 1 to 2, which is described in one of Tables 1 to 4, was applied onto both surfaces of any one of the above-mentioned polarizers, using a wire bar (manufactured by a company limited Dai-Ichi Rika; No. 2). The resultant was wind-dried at 60° C. for one minute to remove the solvent therein to produce an adhesion-improving-layer-attached polarizer. Next, the above-mentioned curable resin composition was applied onto an adhesion surface of any one of the transparent protective films A, and onto an adhesion surface of any one of the transparent protective films B, so as to give each thickness of 0.7 µm, using an MCD coater (manufactured by FUJI KIKAI KOGYO Co., Ltd) (cell shape: honeycomb, the number of gravure lines: 1000 lines/inch, and rotating speed: 140% of the line speed). A rolling device was then used to bond these protective films onto both surfaces of the above-mentioned polarizer, respectively. Thereafter, from an active energy ray radiating device, the above-mentioned visible rays were radiated onto both surfaces of the workpiece from the bonded transparent protective film sides (both sides) thereof to cure the active energy ray curable adhesive. Thereafter, the workpiece was dried by hot wind at 70° C. for 3 minutes to yield a polarizing film having, on both sides thereof, the transparent protective films, respectively. The line speed for the bonding was 25 m/min.

About the polarizing film yielded in each of the working examples and the comparative examples, evaluations described below were made. Results of the evaluations are shown in Tables 1 to 5.

<Adhering Strength Test>

The polarizing film yielded in each of the examples was cut into pieces each having a size of 200 mm in a direction in parallel with the stretched direction of the polarizer, and 20 mm in an direction orthogonal thereto. A utility knife was cut into between one of the transparent protective films and the polarizer of one of the pieces, and into between the other side transparent protective film and the polarizer of another of the pieces. Each of the resultant polarizing films was bonded to a glass plate. A machine Tensilon was used to peel off the transparent protective film and the polarizer from each other into 90-degree directions at a peel rate of 10 m/min. The peel strength thereof was measured. Moreover, after the peeling, an infrared absorption spectrum of each of the resultant peel surfaces was measured, using an ATR method. The peel interface was then evaluated in accordance with the following criterion:

A: cohesive fracture of the one or the other transparent protective film,

B: interfacial fracture between the transparent protective film and the adhesive layer, C: interfacial fracture between the adhesive layer and the polarizer, or D: cohesive fracture of the polarizer.

In this criterion, A and D each mean that the adhering strength is not less than the cohesive strength of the film so that the adhering strength is very good. In the meantime, B and C each mean that the transparent-protective-film/adhesive-layer (adhesive-layer/polarizer) interface is insufficient in adhering strength (or poor in adhering strength). Considering these matters, when the polarizing film falls under A or D, the adhering strength is judged to be good (circular mark); when the polarizing film falls under A and B (simultaneous generation of "cohesive fracture of the transparent protective film" and "interfacial fracture between the transparent protective film and the adhesive layer") or under A and C (simultaneous generation of "cohesive fracture of the transparent protective film" and "interfacial fracture between the adhesive layer and the polarizer"), the adhering strength is judged to be acceptable (triangular mark); or when the polarizing film falls under B or C, the adhering strength is judged to be bad (cross mark).

<Cold Water Immersion Peeling Test>

The polarizing film yielded in each of the examples was cut into pieces each having a size of 200 mm in a direction in parallel with the stretched direction of the polarizer, and 20 mm in an direction orthogonal thereto. The polarizing films were immersed in pure water of 23° C. temperature for 24 hours, and then taken out. The polarizing films were wiped with a dried cloth, and then a utility knife was cut into between one of the transparent protective films and the polarizer of one of the pieces, and into between the other side transparent protective film and the polarizer of another of the pieces. Each of the resultant polarizing films was bonded to a glass plate. A machine Tensilon was used to peel off the transparent protective film and the polarizer from each other into 90-degree directions at a peel rate of 10 m/min. The peel strength thereof was measured. Moreover, after the peeling, an infrared absorption spectrum of each of the resultant peel surfaces was measured, using an ATR method. The peel interface was then evaluated in accordance with the same criterion as in the adhering strength test. This evaluation was made within one minute after the time when the polarizing film was taken out from the pure water.

<Severe Cold Water Immersion Peeling Test>

The polarizing film yielded in each of the examples was cut into pieces each having a size of 200 mm in a direction in parallel with the stretched direction of the polarizer, and 20 mm in an direction orthogonal thereto. The polarizing films were immersed in pure water of 23° C. temperature for 48 hours, and then taken out. The polarizing films were wiped with a dried cloth, and then a utility knife was cut into between one of the transparent protective films and the polarizer of one of the pieces, and into between the other side transparent protective film and the polarizer of another of the pieces. Each of the resultant polarizing films was bonded to a glass plate. A machine Tensilon was used to peel off the transparent protective film and the polarizer from each other into 90-degree directions at a peel rate of 10 m/min. The peel strength thereof was measured. Moreover, after the peeling, an infrared absorption spectrum of each of the resultant peel surfaces was measured, using an ATR method. The peel interface was then evaluated in accordance with the same criterion as in the adhering strength test. This evaluation was made within one minute after the time when the polarizing film was taken out from the pure water.

TABLE 1

|  |  |  | Comparative Example | | Example | |
|---|---|---|---|---|---|---|
|  |  |  | 1 | 2 | 1 | 2 |
| Adhesion-improving composition (A) | Boron compounds | Boric acid |  |  |  |  |
|  |  | 3-Acrylamidephenylboric acid |  |  |  |  |
|  |  | 3-Methacrylamidephenylboric acid |  |  | 1 |  |
|  |  | 4-Methacrylamidephenylboric acid |  |  |  | 1 |
|  |  | 4-Vinylphenylboric acid |  |  |  |  |
|  | Levelling agent | OLFINE EXP 4200 |  |  | 0.1 | 0.1 |
|  | Binder components | ARON A-104 |  |  |  |  |
|  |  | JC-25 |  |  |  |  |
|  | Silane coupling agents | KBM-603 |  |  |  |  |
|  |  | X-12-967C |  |  |  |  |
|  |  | KBM-602 |  |  |  |  |
|  |  | KBM-5103 |  |  |  |  |
|  | Titanium compounds | TA-21 |  |  |  |  |
|  |  | TC-100 |  |  |  |  |
|  |  | TC-750 |  |  |  |  |
|  | Carboxyl-group-containing monomers | M-5300 |  |  |  |  |
|  |  | HOA-MS |  |  |  |  |
|  | Solvents | Water |  |  |  |  |
|  |  | Isopropyl alcohol |  |  | 97.9 | 97.9 |
|  | Wire bar count |  |  |  | 2 | 2 |
|  | Dried treated-layer thickness [nm] |  |  |  | 55 | 55 |
| Adhesion-improving-layer-formation surface |  |  | Without any adhesion-improving layer | Without any adhesion-improving layer | With adhesion-improving layer only on polarizer side | With adhesion-improving layer only on polarizer side |
| Water content in polarizing plate | % |  | 20 | 17 | 15 | 15 |
| Evaluations |  |  |  |  |  |  |
| Adhering strength (protective film A) | Peel strength | | 0.7N | 0.3N | 2.7N | 3N |
|  | Decision | | X (C) | X (C) | ○ (A) | ○ (A) |
| Adhering strength (protective film B) | Peel strength | | 0.5N | 0.4N | 2.9N | 2.6N |
|  | Decision | | X (C) | X (C) | ○ (A) | ○ (A) |
| Cold water immersion peeling test (protective film A) | Peel strength | | 0.2N | 0.2N | 2.2N | 1.5N |
|  | Decision | | X (C) | X (C) | ○ (A) | ○ (A) |
| Cold water immersion peeling test (protective film B) | Peel strength | | 0.2N | 0.2N | 2.3N | 1.5N |
|  | Decision | | X (C) | X (C) | ○ (A) | ○ (A) |
| Severe cold water immersion peeling test (protective film A) | Peel strength | | 0.2N | 0.2N | 2.0N | 1.2N |
|  | Decision | | X (C) | X (C) | ○ (A) | Δ (A · C) |
| Severe cold water immersion peeling test (protective film B) | Peel strength | | 0.2N | 0.2N | 1.8N | 1.0N |
|  | Decision | | X (C) | X (C) | ○ (A) | Δ (A · C) |

|  |  |  | Example | | |
|---|---|---|---|---|---|
|  |  |  | 3 | 4 | 5 |
| Adhesion-improving composition (A) | Boron compounds | Boric acid |  |  |  |
|  |  | 3-Acrylamidephenylboric acid | 2 | 1 | 0.1 |
|  |  | 3-Methacrylamidephenylboric acid |  |  |  |
|  |  | 4-Methacrylamidephenylboric acid |  |  |  |
|  |  | 4-Vinylphenylboric acid |  |  |  |
|  | Levelling agent | OLFINE EXP 4200 |  |  |  |
|  | Binder components | ARON A-104 |  |  |  |
|  |  | JC-25 |  |  |  |

TABLE 1-continued

|  |  |  |  |  |  |
|---|---|---|---|---|---|
| | Silane coupling agents | KBM-603 X-12-967C KBM-602 KBM-5103 | | | |
| | Titanium compounds | TA-21 TC-100 TC-750 | | | |
| | Carboxyl-group-containing monomers | M-5300 HOA-MS | | | |
| | Solvents | Water | | | |
| | | Isopropyl alcohol | 98 | 99 | 99.9 |
| | Wire bar count | | 2 | 2 | 2 |
| | Dried treated-layer thickness [nm] | | 100 | 50 | 5 |
| Adhesion-improving-layer-formation surface | | | With adhesion-improving layer only on polarizer side | With adhesion-improving layer only on polarizer side | With adhesion-improving layer only on polarizer side |
| Water content in polarizing plate | | % | 15 | 15 | 15 |
| Evaluations | | | | | |
| Adhering strength (protective film A) | | Peel strength Decision | 2.8N ○ (A) | 2.7N ○ (A) | 3N ○ (A) |
| Adhering strength (protective film B) | | Peel strength Decision | 2.5N ○ (A) | 2.9N ○ (A) | 2.6N ○ (A) |
| Cold water immersion peeling test (protective film A) | | Peel strength Decision | 1.8N ○ (A) | 2.2N ○ (A) | 1.7N ○ (A) |
| Cold water immersion peeling test (protective film B) | | Peel strength Decision | 1.9N ○ (A) | 2.3N ○ (A) | 1.8N ○ (A) |
| Severe cold water immersion peeling test (protective film A) | | Peel strength Decision | 1.5N ○ (A) | 2.0N ○ (A) | 1.5N ○ (A) |
| Severe cold water immersion peeling test (protective film B) | | Peel strength Decision | 1.5N ○ (A) | 1.8N ○ (A) | 1.6N ○ (A) |

TABLE 2

| | | | Example | | |
|---|---|---|---|---|---|
| | | | 6 | 7 | 8 |
| Adhesion-improving composition (A) | Boron compounds | Boric acid 3-Acrylamidephenylboric acid 3-Methacrylamidephenylboric acid 4-Methacrylamidephenylboric acid 4-Vinylphenylboric acid | 1 | 1 | 1 |
| | Levelling agent | OLFINE EXP 4200 | | | |
| | Binder components | ARON A-104 JC-25 | | | |
| | Silane coupling agents | KBM-603 X-12-967C KBM-602 KBM-5103 | | | |
| | Titanium compounds | TA-21 TC-100 TC-750 | | | |
| | Carboxyl-group-containing monomers | M-5300 HOA-MS | | | |
| | Solvents | Water | | | |
| | | Isopropyl alcohol | 99 | 99 | 99 |
| | Wire bar count | | 2 | 2 | 2 |
| | Dried treated-layer thickness [nm] | | 50 | 50 | 50 |
| Adhesion-improving-layer-formation surface | | | With adhesion-improving layer only on polarizer side | With adhesion-improving layer only on polarizer side | With adhesion-improving layer only on polarizer side |

TABLE 2-continued

| | | | | |
|---|---|---|---|---|
| Water content in polarizing plate | % | 13 | 10 | 5 |
| Evaluations | | | | |
| Adhering strength (protective film A) | Peel strength | 2.9N | 2.8N | 2.8N |
| | Decision | ○ (A) | ○ (A) | ○ (A) |
| Adhering strength (protective film B) | Peel strength | 3.0N | 3.1N | 3.1N |
| | Decision | ○ (A) | ○ (A) | ○ (A) |
| Cold water immersion peeling test (protective film A) | Peel strength | 2.1N | 2.2N | 2.0N |
| | Decision | ○ (A) | ○ (A) | ○ (A) |
| Cold water immersion peeling test (protective film B) | Peel strength | 2.1N | 2.4N | 2.3N |
| | Decision | ○ (A) | ○ (A) | ○ (A) |
| Severe cold water immersion peeling test (protective film A) | Peel strength | 1.8N | 2.0N | 2.0N |
| | Decision | ○ (A) | ○ (A) | ○ (A) |
| Severe cold water immersion peeling test (protective film B) | Peel strength | 2.1N | 2.0N | 2.1N |
| | Decision | ○ (A) | ○ (A) | ○ (A) |

| | | | | Example | | |
|---|---|---|---|---|---|---|
| | | | | 9 | 10 | 11 |
| Adhesion-improving composition (A) | Boron compounds | Boric acid | | | | |
| | | 3-Acrylamidephenylboric acid | | 1 | 1 | 1 |
| | | 3-Methacrylamidephenylboric acid | | | | |
| | | 4-Methacrylamidephenylboric acid | | | | |
| | | 4-Vinylphenylboric acid | | | | |
| | Levelling agent | OLFINE EXP 4200 | | 0.1 | 0.1 | 0.1 |
| | Binder components | ARON A-104 | | 1 | 1 | 1 |
| | | JC-25 | | | | |
| | Silane coupling agents | KBM-603 | | | | |
| | | X-12-967C | | | | |
| | | KBM-602 | | | | |
| | | KBM-5103 | | | | |
| | Titanium compounds | TA-21 | | | | |
| | | TC-100 | | | | |
| | | TC-750 | | | | |
| | Carboxyl-group-containing monomers | M-5300 | | | | |
| | | HOA-MS | | | | |
| | Solvents | Water | | | | |
| | | Isopropyl alcohol | | 97.9 | 97.9 | 97.9 |
| | Wire bar count | | | 2 | 2 | 2 |
| | Dried treated-layer thickness [nm] | | | 105 | 105 | 105 |
| Adhesion-improving-layer-formation surface | | | | With adhesion-improving layer only on polarizer side | With adhesion-improving layer only on polarizer side | With adhesion-improving layer only on polarizer side |
| Water content in polarizing plate | % | | | 13 | 20 | 18 |
| Evaluations | | | | | | |
| Adhering strength (protective film A) | Peel strength | | | 3N | 1.0N | 2.1N |
| | Decision | | | ○ (A) | Δ (A · C) | ○ (A) |
| Adhering strength (protective film B) | Peel strength | | | 2.6N | 0.8N | 2.5N |
| | Decision | | | ○ (A) | Δ (A · C) | ○ (A) |
| Cold water immersion peeling test (protective film A) | Peel strength | | | 2.2N | 0.7N | 1.2N |
| | Decision | | | ○ (A) | Δ (A · C) | Δ (A · C) |
| Cold water immersion peeling test (protective film B) | Peel strength | | | 1.8N | 0.6N | 1.1N |
| | Decision | | | ○ (A) | Δ (A · C) | Δ (A · C) |
| Severe cold water immersion peeling test (protective film A) | Peel strength | | | 1.7N | 0.5N | 0.4N |
| | Decision | | | ○ (A) | Δ (A · C) | Δ (A · C) |
| Severe cold water immersion peeling test (protective film B) | Peel strength | | | 1.6N | 0.5N | 0.6N |
| | Decision | | | ○ (A) | Δ (A · C) | Δ (A · C) |

TABLE 3

| | | | Example | | | | | | | |
|---|---|---|---|---|---|---|---|---|---|---|
| | | | 12 | 13 | 14 | 15 | 16 | 17 | 18 | 19 |
| Adhesion-improving composition (A) | Boron compounds | Boric acid | | | | | | | | |
| | | 3-Acrylamidephenylboric acid | | | | | | | 1 | |
| | | 3-Methacrylamidephenylboric acid | | | | | | | 0.1 | |
| | | 4-Methacrylamidephenylboric acid | | | | | | 2.5 | 2.5 | |
| | | 4-Vinylphenylboric acid | 0.01 | | | 0.05 | | | | 1 |
| | Levelling agent | OLFINE EXP 4200 | | 1 | 1 | | 1 | 1 | | |
| | Binder components | ARON A-104 | | | | | | | | |
| | | JC-25 | | | | | | | | |
| | Silane coupling agents | KBM-603 | | | | | | | | |
| | | X-12-967C | | | | | | | | |
| | | KBM-602 | | | | | 1 | | | |
| | | KBM-5103 | | | | | | | | |
| | Titanium compounds | TA-21 | | | | | | | | |
| | | TC-100 | | | | | | | | |
| | | TC-750 | | | | | | | | |
| | Carboxyl-group-containing monomers | M-5300 | | | | | | | | |
| | | HOA-MS | | | | | | | | |
| | Solvents | Water | 99.99 | 99 | 99 | 99.8 | 78 | 76.5 | 76.5 | |
| | | Isopropyl alcohol | | | 10 | | 20 | 20 | 20 | |
| | Wire bar count | | 2 | 2 | 2 | 2 | 2 | 2 | 2 | 2 |
| | Dried treated-layer thickness [nm] | | 0.5 | 50 | 250 | 5 | 100 | 100 | 100 | 50 |
| Adhesion-improving-layer-formation surface | | | With adhesion-improving layer only on polarizer side | With adhesion-improving layer only on polarizer side | With adhesion-improving layer only on polarizer side | With adhesion-improving layer only on polarizer side | With adhesion-improving layer only on polarizer side | With adhesion-improving layer only on polarizer side | With adhesion-improving layer only on polarizer side | With adhesion-improving layer only on polarizer side |
| Water content in polarizing plate | % | | 15 | 15 | 15 | 15 | 15 | 15 | 15 | 15 |
| Evaluations | | | | | | | | | | |
| Adhering strength (protective film A) | | Peel strength | 2.5N | 2.8N | 2.3N | 2.4N | 2.6N | 2.6N | 2.5N | 2.5N |
| | | Decision | ○ (A) | ○ (A) | ○ (A) | ○ (A) | ○ (A) | ○ (A) | ○ (A) | ○ (A) |
| Adhering strength (protective film B) | | Peel strength | 2.9N | 2.8N | 2.9N | 3.0N | 2.9N | 3.0N | 3.0N | 2.9N |
| | | Decision | ○ (A) | ○ (A) | ○ (A) | ○ (A) | ○ (A) | ○ (A) | ○ (A) | ○ (A) |
| Cold water immersion peeling test (protective film A) | | Peel strength | 2.2N | 2.9N | 1.7N | 2.1N | 2.2N | 2.3N | 2.2N | 0.5N |
| | | Decision | ○ (A) | ○ (A) | ○ (A) | ○ (A) | ○ (A) | ○ (A) | ○ (A) | Δ (A·C) |
| Cold water immersion peeling test (protective film B) | | Peel strength | 1.9N | 2.3N | 1.3N | 2.0N | 2.3N | 2.5N | 2.5N | 0.6N |
| | | Decision | ○ (A) | ○ (A) | ○ (A) | ○ (A) | ○ (A) | ○ (A) | ○ (A) | Δ (A·C) |

TABLE 4

| | | | Example | | | | | | | |
|---|---|---|---|---|---|---|---|---|---|---|
| | | | 20 | 21 | 22 | 23 | 24 | 25 | 26 | 27 |
| Adhesion-improving composition (A) | Boron compounds | Boric acid | | | | | | | | |
| | | 3-Acrylamidephenylboric acid | | | | | | | | |
| | | 3-Methacrylamidephenylboric acid | | | | | | | | |
| | | 4-Methacrylamidephenylboric acid | | | | | | | 0.5 | |
| | | 4-Vinylphenylboric acid | | | | | | | | 0.5 |
| | Levelling agent | OLFINE EXP 4200 | | | | | | | | |
| | Binder components | ARON A-104 | | | | | | | | |
| | | JC-25 | | | | | | | | |
| | Silane coupling agents | KBM-603 | | 0.5 | | | | | | |
| | | X-12-967C | | | | | | | | |
| | | KBM-602 | | | | | | | | |
| | | KBM-5103 | | | | | | | | |
| | Titanium compounds | TA-21 | 0.5 | 0.5 | 0.5 | 0.05 | 0.01 | 0.5 | | |
| | | TC-100 | 0.5 | | | | | | | |
| | | TC-750 | | | | | | 0.5 | | 0.5 |
| | Carboxyl-group-containing monomers | M-5300 | | | 0.5 | 0.05 | 0.01 | | 0.5 | |
| | | HOA-MS | | | | | | | | |
| | Solvents | Water | | | | | | | | |
| | | Isopropyl alcohol | | | | | | | | |
| | Wire bar count | | 2 | 2 | 2 | 2 | 2 | 2 | 2 | 2 |
| Dried treated-layer thickness [nm] | | | 50 | 50 | 50 | 5 | 1 | 50 | 50 | 50 |
| Adhesion-improving-layer-formation surface | | | With adhesion-improving layer only on polarizer side | With adhesion-improving layer only on polarizer side | With adhesion-improving layer only on polarizer side | With adhesion-improving layer only on polarizer side | With adhesion-improving layer only on polarizer side | With adhesion-improving layer only on polarizer side | With adhesion-improving layer only on polarizer side | With adhesion-improving layer only on polarizer side |
| Water content in polarizing plate | % | | 15 | 15 | 15 | 15 | 15 | 15 | 15 | 15 |
| Evaluations | | | | | | | | | | |
| Adhering strength (protective film A) | | Peel strength | 2.8N | 2.3N | 2.4N | 2.6N | 2.6N | 2.3N | 2.3N | 2.5N |
| | | Decision | ○ (A) | ○ (A) | ○ (A) | ○ (A) | ○ (A) | ○ (A) | ○ (A) | ○ (A) |
| Adhering strength (protective film B) | | Peel strength | 2.8N | 2.9N | 3.0N | 2.9N | 3.0N | 2.5N | 2.7N | 2.7N |
| | | Decision | ○ (A) | ○ (A) | ○ (A) | ○ (A) | ○ (A) | ○ (A) | ○ (A) | ○ (A) |
| Cold water immersion peeling test (protective film A) | | Peel strength | 0.8N | 0.5N | 1.1N | 1.0N | 0.9N | 0.5N | 0.6N | 1.2N |
| | | Decision | Δ (A · C) | Δ (A · C) | Δ (A · C) | Δ (A · C) | Δ (A · C) | Δ (A · C) | Δ (A · C) | Δ (A · C) |
| Cold water immersion peeling test (protective film B) | | Peel strength | 0.9N | 0.5N | 1.1N | 1.1N | 0.9N | 0.5N | 0.6N | 1.1N |
| | | Decision | Δ (A · C) | Δ (A · C) | Δ (A · C) | Δ (A · O) | Δ (A · C) | Δ (A · C) | Δ (A · C) | Δ (A · C) |

Example 28, and Comparative Examples 3 to 5

An adhesion-improving composition (A) used in each of Example 28 and Comparative Examples 3 to 5 was yielded by mixing individual components with each other in accordance with a blend table described in Table 5.

(Production of Polarizing Film)

The composition (A) used in each of Example 28 and Comparative Examples 3 to 5, which is described in Table 5, was applied onto both surfaces of any one of the above-mentioned polarizers, using a wire bar (manufactured by a company limited Dai-Ichi Rika; No. 2). The resultant was wind-dried at 60° C. for one minute to remove the solvent therein to produce an adhesion-improving-layer-attached polarizer. Next, each of two of the transparent protective films C was subjected to corona treatment, and the corona-treated surface of the film was coated with the composition (A) used in the example, which is described in Table 5. The resultants were then dried at 60° C. for one minute to remove the solvent therein. In this way, adhesion-improving-layer-attached protective films C were produced. The above-mentioned curable resin composition was applied onto adhesion surfaces of the adhesion-improving-layer-attached polarizer and each of the adhesion-improving-layer-attached protective films C, so as to give each thickness of 0.7 μm, using an MCD coater (manufactured by FUJI KIKAI KOGYO Co., Ltd) (cell shape: honeycomb, the number of gravure lines: 1000 lines/inch, and rotating speed: 140% of line speed). A rolling device was then used to cause the protective films to adhere onto both surfaces of the polarizer, respectively. Thereafter, from an active energy ray radiating device, the above-mentioned visible rays were radiated onto both surfaces of the workpiece from the bonded transparent protective film sides (both sides) thereof to cure the active energy ray curable adhesive. Thereafter, the workpiece was dried by hot wind at 70° C. for 3 minutes to yield a polarizing film having, on both sides thereof, the transparent protective films, respectively. The line speed for the bonding was 25 m/min.

an adhesion-improving layer interposed between the polarizer and the adhesive layer, the adhesion-improving layer having a thickness of 300 nm or less and 0.1 nm or more, wherein the adhesion-improving layer comprises a compound represented by the following general formula (1'):

Y is an organic group, X is a functional group containing a reactive group, and $R^1$ and $R^2$ each independently represent a hydrogen atom, or an aliphatic hydrocarbon group, aryl group or heterocyclic group that may have a substituent, and the compound represented by the general formula (1) is interposed between the polarizer and the adhesive layer.

2. The polarizing film according to claim 1, wherein the reactive group that the compound represented by the general formula (1') has is at least one reactive group selected from the group consisting of α, β-unsaturated carbonyl, vinyl, vinyl ether, epoxy, oxetane, amino, aldehyde, mercapto, and halogen groups.

3. The polarizing film according to claim 1, wherein the adhesion-improving layer comprises an organometallic compound having a structural formula having an M-O bond wherein M is silicon, titanium, aluminum or zirconium, and O represents an oxygen atom, and the organometallic compound is interposed between the polarizer and the adhesive layer.

TABLE 5

|  |  | Example | Comparative Example | | |
|---|---|---|---|---|---|
|  |  | 28 | 6 | 7 | |
| Adhesion-improving composition (A) | Boric acid 4-Vinylphenylboric acid Isopropyl alcohol | 0.01 99.99 | 0.01 99.99 | 0.01 99.99 | |
| Wire bar count |  | 2 | 2 | 2 | |
| Dried adhesion-improving layer thickness [nm] |  | 0.5 | 0.5 | 0.5 | |
| Adhesion-improving layer applied surface |  | With adhesion-improving layer both on polarizer side and substrate side | With adhesion-improving layer only on substrate side | With adhesion-improving layer only on polarizer side | None |
| Adhering strength (protective film C) | Peel strength Decision | 2.1N ○ (A) | 2.1N ○ (A) | 1.8N ○ (A) | 1.8N ○ (A) |
| Cold water immersion peeling test (protective film C) | Peel strength Decision | 1.4N ○ (A) | 0.2N x (C) | 0.2N x (B) | 0.2N x (C) |

The invention claimed is:

1. A polarizing film, comprising a polarizer, a transparent protective film laminated on/over at least one surface of the polarizer, an adhesive layer between the one surface of the polarizer and the transparent protective film, and 4. The polarizing film according to claim 3, wherein the organometallic compound is an organic silicon compound.

5. The polarizing film according to claim 3, wherein the organometallic compound is at least one compound selected from the group consisting of metal alkoxides and metal chelates.

6. The polarizing film according to claim 5, wherein the metal of the metal alkoxides and the metal chelates is titanium.

7. The polarizing film according to claim 3, wherein the organometallic compound is at least one selected from the group consisting of titanium acylates, titanium alkoxides, and titanium chelates.

8. An optical film, wherein at least one polarizing film as recited in claim 1 is laminated.

9. An image display device, comprising an optical film as recited in claim 8.

10. An image display device, using a polarizing film as recited in claim 1.

11. A method for producing a polarizing film comprising a polarizer, and a transparent protective film laminated on/over at least one surface of the polarizer to interpose an adhesive layer between the surface and the transparent protective film; the method comprising:
an applying step of applying an adhesion-improving layer comprising a step of causing a compound represented by the following general formula (1'):

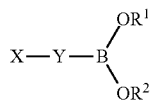

(1')

wherein Y is an organic group, X is a functional group containing a reactive group, and $R^1$ and $R^2$ each independently represent a hydrogen atom, or an aliphatic hydrocarbon group, aryl group or heterocyclic group that may have a substituent, or an organometallic compound having a structural formula having an M-O bond wherein M is silicon, titanium, aluminum or zirconium, and O represents an oxygen atom to adhere to the adhesion surface of the polarizer, the adhesion-improving layer having a thickness of 300 nm or less and 0.1 nm or more,
an applying step of applying a curable resin composition to the adhesion surface of at least one of the polarizer and the transparent protective film,
a bonding step of bonding the polarizer and the transparent protective film to each other, and
an adhering step of radiating an active energy ray to the resultant workpiece from a polarizer surface side or a transparent protective film surface side of the workpiece to yield an adhesive layer, and causing the polarizer and the transparent protective film to adhere to each other through the yielded adhesive layer.

12. The method according to claim 11, wherein the step of applying the adhesion-improving layer is selected from the group consisting of a reverse coater, a gravure coater, a bar reverse coater, a roll coater, a die coater, a bar coater, and a rod coater.

* * * * *